United States Patent
Rucker et al.

(10) Patent No.: US 9,289,899 B2
(45) Date of Patent: Mar. 22, 2016

(54) CONTINUUM ROBOTS AND CONTROL THEREOF

(75) Inventors: Daniel Caleb Rucker, Nashville, TN (US); Robert James Webster, Nashville, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 131 days.

(21) Appl. No.: 13/808,994

(22) PCT Filed: May 31, 2011

(86) PCT No.: PCT/US2011/038539
§ 371 (c)(1),
(2), (4) Date: Feb. 5, 2013

(87) PCT Pub. No.: WO2012/005834
PCT Pub. Date: Jan. 12, 2012

(65) Prior Publication Data
US 2013/0131868 A1       May 23, 2013

Related U.S. Application Data

(60) Provisional application No. 61/362,353, filed on Jul. 8, 2010.

(51) Int. Cl.
| | |
|---|---|
| G05B 15/00 | (2006.01) |
| G05B 19/00 | (2006.01) |
| B25J 9/16 | (2006.01) |
| B25J 18/06 | (2006.01) |
| B25J 15/12 | (2006.01) |

(52) U.S. Cl.
CPC *B25J 9/16* (2013.01); *B25J 9/1625* (2013.01); *B25J 9/1635* (2013.01); *B25J 15/12* (2013.01); *B25J 18/06* (2013.01); *G05B 2219/39186* (2013.01); *G05B 2219/40279* (2013.01); *Y10S 901/31* (2013.01)

(58) Field of Classification Search
USPC ........ 606/130; 604/95.01; 600/118, 159, 132; 91/418; 700/262, 245, 250, 260
See application file for complete search history.

(56) References Cited

U.S. PATENT DOCUMENTS

| | | | | |
|---|---|---|---|---|
| 5,317,952 | A | * | 6/1994 | Immega .......................... 91/418 |
| 6,986,739 | B2 | * | 1/2006 | Warren et al. .................. 600/159 |
| 8,460,236 | B2 | * | 6/2013 | Roelle et al. ................ 604/95.01 |
| 8,672,837 | B2 | * | 3/2014 | Roelle et al. .................. 600/118 |
| 2003/0018388 | A1 | | 1/2003 | Comer |
| 2005/0028237 | A1 | | 2/2005 | Greenhill et al. |

(Continued)

OTHER PUBLICATIONS

Bergou et al., "Discrete elastic rods", ACM Trans. Graph. (2008) 27(3). (12 pages).

(Continued)

*Primary Examiner* — Ronnie Mancho
(74) *Attorney, Agent, or Firm* — Novak Druce Connolly Bove + Quigg LLP

(57) ABSTRACT

Method for controlling continuum robots and systems therefrom are provided. In the system and method, a new system of equations is provided for controlling a shape of the elastic member and a tension on a tendon applying a force to an elastic member of the robot. The system of equations can be used to estimate a resulting shape of the elastic member from the tension applied to the tendon. The system of equations can also be used to estimate a necessary tension for the tendon to achieve a target shape.

20 Claims, 12 Drawing Sheets

(56) References Cited

U.S. PATENT DOCUMENTS

| | | | |
|---|---|---|---|
| 2009/0024141 A1* | 1/2009 | Stahler et al. | 606/130 |
| 2009/0123111 A1* | 5/2009 | Udd | 385/13 |
| 2009/0138025 A1* | 5/2009 | Stahler et al. | 606/130 |
| 2009/0182436 A1 | 7/2009 | Ferrara | |
| 2010/0263470 A1 | 10/2010 | Bannasch et al. | |
| 2011/0319815 A1* | 12/2011 | Roelle et al. | 604/95.01 |
| 2012/0010628 A1* | 1/2012 | Cooper et al. | 606/130 |
| 2013/0165945 A9* | 6/2013 | Roelle et al. | 606/130 |

OTHER PUBLICATIONS

Buckingham et al., "Reaching the unreachable—Snake arm robots", Retrieved on Aug. 27, 2013, from http://www.ocrobotics.com/downloads/EngineeringNov04.pdf (1 page).

Camarillo et al., "Mechanics modeling of tendon-driven continuum manipulators", IEEE Transactions on Robotics (2008) 24(6): 1262-1273.

Chirikjian et al., "A modal approach to hyper-redundant manipulator kinematics", IEEE Trans. Robot. Auton. (1994) 10(3): 343-353.

Chirikjian, "Hyper-redundant manipulator dynamics: A continuum approximation", Adv Robot (1995) 9(3): 217-243.

Chirikjian et al., "Kinematically optimal hyper-redundant manipulator configurations", IEEE Trans. Robot. Autom. (1995) 11(6): 794-806.

Davis et al., "A model for the embedded tendon control of a slender three-dimensional flexible robot link", Dynamics and Control (1994) 4(2): 185-208.

Gravagne, "Design, analysis and experimentation: The fundamentals of continuum robotic manipulators", Ph.D. Dissertation, Dept Elect Comput Eng, Clemson Univ. (2002). (135 pages).

Gravagne et al., "Large deflection dynamics and control for planar continuum robots", IEEE/ ASME Trans. Mechatron (2003) 8: 299-307.

Gravagne et al., "Manipulability, force, and compliance analysis for planar continuum robots", IEEE Tran. Robot. Autom (2002) 18(3): 263-273.

International Search Report and the Written Opinion mailed on Feb. 9, 2012 in PCT Application No. PCT/US2011/038539, international filed May 31, 2011. (9 pages).

Jones et al., "Three-dimensional statics for continuum robots", Proc. IEEE/RSJ Inc. Conf. Intell. Robots Syst. (2009): 2659-2664.

Li et al., "Design of continuous backbone, cable-driven robots", ASME J Mech Design (2002) 124(2): 265-271.

Murray et al., "A mathematical introduction to robotic manipulation", CRC Press: Boca Raton (1994). (474 pages).

Robinson et al., "Continuum robots—A state of the art", Proc IEEE Int Conf Robot Autom (1999): 2849-2854.

Rucker et al., "A geometrically exact model for externally loaded concentric-tube continuum robots", IEEE Trans Robot (2010) 26(5): 769-780.

Rucker et al., "Exact mechanics of continuum robots with general tendon routing", Proc 12th Int Symp Exp Robot (2010): 1-10.

Shampine, "Solving hyperbolic PDE's in MATLAB", Appl. Numer. Anal. Comput. Math. (2005) 2(3): 346-358.

Simaan et al., "Steerable continuum robot design for cochlear implant surgery", Proc. IEEE Int. Conf. Robot. Autom. (2010): 36-38.

Trivedi et al., "Soft robotics: Biological inspiration, state of the art, and future research", Appl. Bionics Biomech (2008) 5(3): 99-117.

Webster et al., "Design and kinematic modeling of constant curvature continuum robots: A review", Int J Robot Res (2010 29: 1661-1683.

Wilson et al., "The mechanics of positioning highly flexible manipulator limbs", J Mech Transmiss Autom Design (1989) 111: 232-237.

Xu et al., "Analytic formulation for kinematics, statics and shape restoration of multi-backbone continuum robots via elliptic integrals", ASME J Mech Robot (2010) 2(1): 011 006-1-011 006-13.

Xu et al., "Intrinsic wrench estimation and its performance index for multisegment continuum robots", IEEE Trans Robot (2010) 26(3): 555-561.

\* cited by examiner

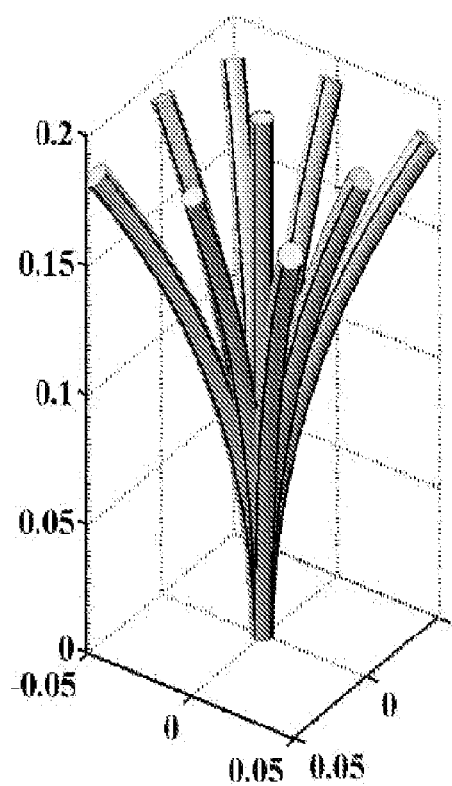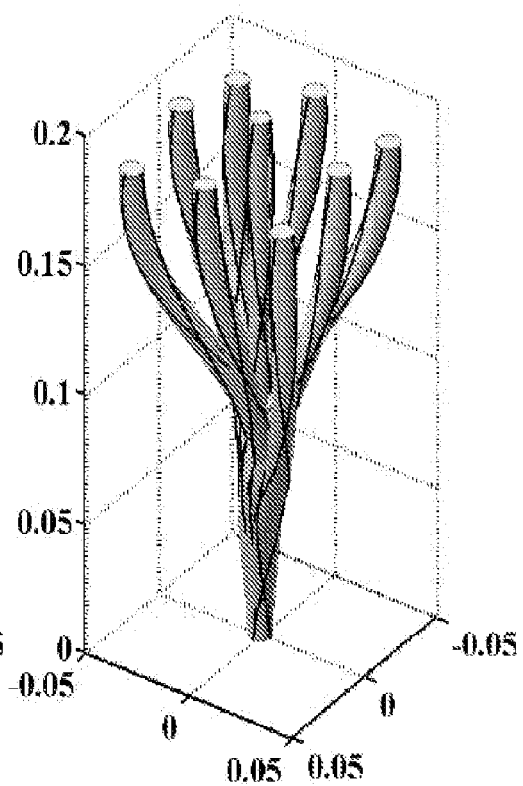
FIG. 2A      FIG. 2B
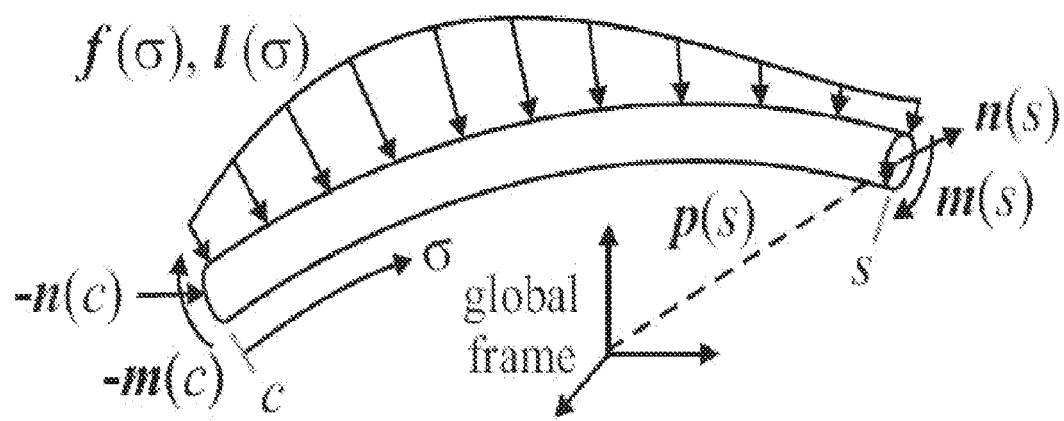
FIG. 3

US 9,289,899 B2

CONTINUUM ROBOTS AND CONTROL THEREOF

CROSS-REFERENCE TO RELATED APPLICATIONS

This application is a §371 national stage entry of International Application No. PCT/US2011/038539, filed May 31, 2011, which claims priority to U.S. Provisional Application No. 61/362,353, filed Jul. 8, 2010, both of which are hereby incorporated by reference.

FIELD OF THE INVENTION

The present invention relates to continuum robots, and more specifically to apparatus and methods for.

BACKGROUND

Continuum robots offer a number of potential advantages over traditional rigid link robots in certain applications, particularly those involving reaching through complex trajectories in cluttered environments or where the robot must compliantly contact the environment along its length. The inherent flexibility of continuum robots makes them gentle to the environment, able to achieve whole arm manipulation, and gives rise to a unique form of dexterity—the shape of the robot is a product of both actuator and externally applied forces and moments. Thus, kinematic models which consider the effects of external loading have been active areas of recent research, and models that consider pneumatic actuation, multiple flexible push-pull rods, and a elastic member consisting of concentric, pre-curved tubes, have recently been derived.

Cosserat rod theory has shown promise as a general tool for describing continuum robots under load, but application of the theory to tendon-actuated continuum robots has not yet been fully explored. Simplified beam mechanics models have been widely used to successfully obtain free-space kinematic models for tendon-actuated robots. The consensus result is that when the tendons are tensioned, the elastic member assumes a piecewise constant curvature shape. This approach is analytically simple and has been thoroughly experimentally vetted on several different robots. However, this approach is limited in that it cannot be used to predict the large spatial deformation of the robot when subjected to additional external loads. Cosserat rod theory provides the modeling framework necessary to solve this problem, and initial work towards applying it to tendon actuated robots has been performed by considering planar deformations and using the simplifying assumption that the load from each tendon consists of a single point moment applied to the rod at the termination arc length. However, such models are limited.

SUMMARY

Embodiments of the invention concern systems and method for controlling continuum robots. In a first embodiment of the invention, a continuum robot is provided. The continuum robot includes an elastic member, a plurality of guide portions disposed along the length of the elastic member, and at least one tendon extending through the plurality of guide portions. In the continuum robot, the tendon is arranged to extend through the plurality of guide portions to define a tendon path, where the tendon is configured to apply a deformation force to the elastic member via the plurality of guide portions, and where the tendon path and an longitudinal axis of the elastic member are not parallel.

In a second embodiment of the invention, a method for managing a continuum robot is provided. In the method, the robot includes an elastic member, a plurality of guide portions disposed along the length of the elastic member, and at least one tendon extending through the plurality of guide portions. In the continuum robot, the tendon is arranged to extend through the plurality of guide portions to define a tendon path, where the tendon is configured to apply a deformation force to the elastic member via the plurality of guide portions. The method includes the steps of applying a tension to the at least one tendon and computing the resulting shape of the elastic member resulting from said tension by solving a system of equations. In the method, the system of equations is given by $$\dot{p} = Rv$$
$$\dot{R} = R\hat{u}$$
$$\begin{bmatrix} \dot{v} \\ \dot{u} \end{bmatrix} = \begin{bmatrix} D+A & G \\ B & C+H \end{bmatrix}^{-1} \begin{bmatrix} d \\ c \end{bmatrix}.$$

where u is the deformed curvature vector consisting of the angular rates of change of the attached rotation matrix R with respect to arc length s, v is a vector comprising linear rates of change of the attached frame with respect to arc length s, C and D are stiffness matrices for the elastic member, and matrices A, B, G, H, are functions of the tension applied to the at least one tendon, the tendon path, and its derivatives, d is vector based on the external force on the elastic member, and c is vector based on an external moment on the elastic member.

In a third embodiment of the invention, a method for managing a continuum robot is provided. In the method, the robot includes an elastic member, a plurality of guide portions disposed along the length of the elastic member, and at least one tendon extending through the plurality of guide portions. In the continuum robot, the tendon is arranged to extend through the plurality of guide portions to define a tendon path, where the tendon is configured to apply a deformation force to the elastic member via the plurality of guide portions. The method includes the steps of determining a target shape for the elastic member and computing a tension for the at least one tendon to provide the target shape by evaluating a system of equations. In the method, the system of equations is given by $$\dot{p} = Rv$$
$$\dot{R} = R\hat{u}$$
$$\begin{bmatrix} \dot{v} \\ \dot{u} \end{bmatrix} = \begin{bmatrix} D+A & G \\ B & C+H \end{bmatrix}^{-1} \begin{bmatrix} d \\ c \end{bmatrix}.$$

where u is the defotmed curvature vector consisting of the angular rates of change of the attached rotation matrix R with respect to arc length s, v is a vector comprising linear rates of change of the attached frame with respect to arc length s, C and D are stiffness matrices for the elastic member, and matrices A, B, G, H, are functions of the tension applied to the at least one tendon, the tendon path, and its derivatives, d is vector based on the external force on the elastic member, and c is vector based on an external moment on the elastic member.

In a fourth embodiment of the invention, a continuum robot is provided. The robot includes an elastic member, a plurality of guide portions disposed along the length of the elastic member, and at least one tendon extending through the plurality of guide portions and arranged to extend through the plurality of guide portions to define a tendon path, wherein the at least one tendon is configured to apply a deformation force to the elastic member via the plurality of guide portions. The robot also includes an actuator for applying a tension to the at least one tendon; and a processing element for using a system of equations for controlling a shape of the elastic member and the tension. The system of equations is given by:

$$\dot{p} = Rv$$
$$\dot{R} = R\hat{u}$$
$$\begin{bmatrix} \dot{v} \\ \dot{u} \end{bmatrix} = \begin{bmatrix} D+A & G \\ B & C+H \end{bmatrix}^{-1} \begin{bmatrix} d \\ c \end{bmatrix}.$$

where u is the deformed curvature vector consisting of the angular rates of change of the attached rotation matrix R with respect to arc length s, v is a vector comprising linear rates of change of the attached frame with respect to arc length s, C and D are stiffness matrices for the elastic member, and matrices A, B, G, H, are functions of the tension applied to the at least one tendon, the tendon path, and its derivatives, d is vector based on the external force on the elastic member, and c is vector based on an external moment on the elastic member.

BRIEF DESCRIPTION OF THE DRAWINGS

FIG. 2A is an illustration of an exemplary of robot shape/workspace modification for a robot with four straight tendons spaced at equal angles around its periphery.

FIG. 2B is an illustration of an exemplary of robot shape/workspace modification for a robot with four helical tendons that each make one full revolution around the shaft.

FIG. 3 is an illustration of an arbitrary section of rod from c to s subject to distributed forces and moments, showing the internal forces n and moments m.

DETAILED DESCRIPTION

Figure 1:
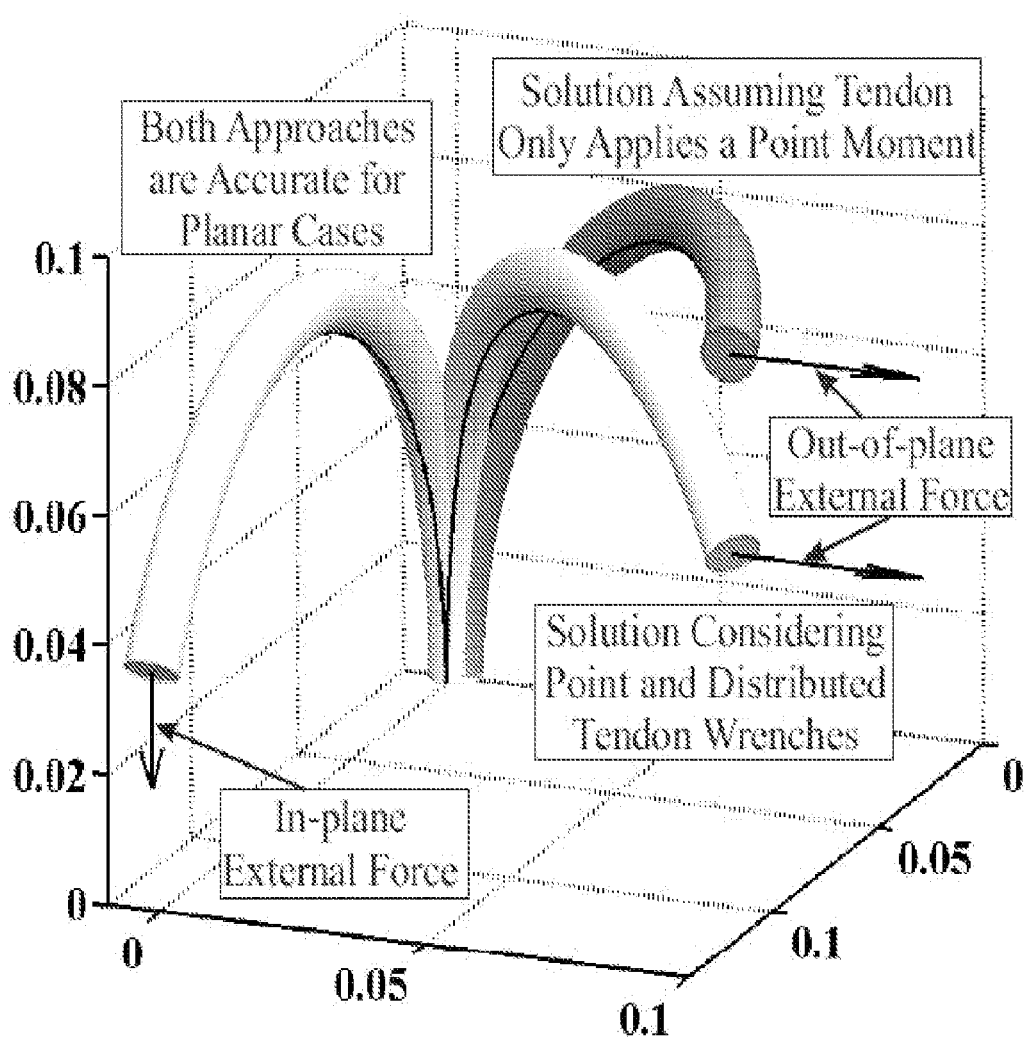
FIG. 1 is an illustration of the results of simulations of a continuum robot with single, straight, tensioned tendons with in-plane and out-of-plane forces applied at the tip.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

I. Introduction

The various embodiments of the invention provide systems and methods for the control of tendon-actuated continuum robots. In particular, the various embodiments of the invention extend previous work on the Cosserat rod-based approach by taking into account not only the attachment point moment, but also the attachment point force and the distributed wrench that the tendon applies along the length of the elastic member. This approach couples the classical Cosserat string and rod models to express tendon loads in terms of the rod's kinematic variables.

The difference between this new coupled model and the point moment model for out of plane loads is shown in FIG. 1, and provide an experimental comparison of the two models described below in Sec. V. FIG. 1 is an illustration of the results of simulations of a continuum robot with single, straight, tensioned tendons with in-plane and out-of-plane forces applied at the tip. These illustrate the difference between the model proposed in this paper which includes distributed tendon wrenches, and the commonly used point moment approximation. For planar deformations and loads, the two models differ only by axial compression (which is small in most cases). However, for out of plane loads, the results differ significantly and including distributed wrenches enhances model accuracy (see Sec. V).

The various embodiments thus provide two new innovations over conventional methods. First, a new Cosserat rod-based model is provided for the spatial deformation of tendon actuated continuum robots under general external point and distributed wrench loads. This model is the first to treat the full effects of all of the tendon loads in a geometrically exact way for large 3D deflections. Second, the new model is the first to describe the mechanics of general tendon routing paths that need not run straight (along the undeformed robot configuration), as has been the case in prior prototypes. Thus, by providing a general model that can address most, if not all, types of tendon routing, this expands the design space and the set of shapes achievable for tendon-actuated robots.

In view of the foregoing, the various embodiments provide systems and methods for controlling continuum robots using exact models for the forward kinematics, statics, and dynamics and with general tendon routing experiencing external point and distributed loads. The models account for lance deformations due to bending, torsion, shear, and elongation. The static model is formulated as a set of nonlinear differential equations in standard form, and the dynamic model consists of a system of hyperbolic partial differential equations.

Using this approach, one can accurately predict the shape of a physical prototype with both straight and non-straight tendon routing paths and with external loading. With calibrated parameters, the mean tip error with respect to the total robot length can be significantly reduced as compared to conventional methods.

As illustrated in FIGS. 2A and 2B, the design space of achievable robot shapes can be expanded by considering alternative tendon paths. For example, FIG. 2A is an illustration of an exemplary of robot shape/workspace modification for a robot with four straight tendons spaced at equal angles around its periphery. In contrast, FIG. 2B is an illustration of an exemplary of robot shape/workspace modification for a robot with four helical tendons that each make one full revolution around the shaft, in accordance with an embodiment of the invention. The two designs differ significantly in tip orientation capability, and the helical design may be better suited to some types of tasks, e.g. a planar industrial pick and place tasks or surgical tasks. Thus, such continuum robots could be used to enhance the capabilities of medical instruments introduced using an orifice or minimal incision and allow additional control during procedures. Some types of devices can include devices for procedures in the throat and airways (introduced via the mouth), in the colon (introduced via the anus), in the stomach (introduced via the mouth and traveling through the esophogus), in the abdomen (either via a transgastric natural orifice transluminal endoscopic surgery approach, or via an incision in the abdomen similar to normal laparoscopic surgery), in skull base surgery (entering via the nose), in the brain and subarachnoid (entering an area around the brain stem and center of the spine) spaces (entering via a craniotomy), or in the bladder and kidneys (entering via the urethra).

The models in accordance with the various embodiments of the invention therefore allow new quasi-static and/or dynamic control techniques for tendon-actuated continuum robots in the future. Furthermore, the inclusion of general external loads in tendon actuated continuum robot models is an important step forward for future practical applications, given their significant sag under self-weight and when carrying payloads. Additionally, such models can be used to address the issue of modeling static friction, and real-time computation of static and dynamic robot shape.

II. Model for a Simple Cosserat Rod

A. Rod Kinematics

In Cosserat-rod theory, a rod is characterized by its centerline curve in space $p(s) \in \mathbb{R}^3$ and its material orientation, $R(s) \in SO(3)$ as functions of a reference parameter $s \in [0\ L]$. Thus a homogeneous transformation can be used to describe the entire rod:

$$g(s) = \begin{bmatrix} R(s) & p(s) \\ 0 & 1 \end{bmatrix}$$

Kinematic variables v(s) and u(s) represent the linear and angular rates of change of g(s) with respect to s expressed in coordinates of the "body frame" g(s). Thus, the evolution of g(s) along s is defined by the following relationships;

$$\dot{R}(s) = R(s)\hat{u}(s), \dot{p}(s) = R(s)v(s) \quad (1)$$

where, the dot denotes a derivative with respect to s, and the ^ and and operators are as defined by R. M. Murray, Z. Li, and S. S. Sastry in "A Mathematical Introduction to Robotic Manipulation." Boca Raton, Fla.: CRC Press, 1994. See also the Derivation Appendix for an explanation of these operators.

Letting the undeformed reference configuration of the rod be g*(s), where the z axis of R*(s) is chosen to be tangent to the curve p*(s). One could use the Frenet-Serret or Bishop's convention to define the x and y axes of R*(s), or, if the rod has a cross section which is not radially symmetric, it is convenient to make the x and y axes align with the principal axes. The reference kinematic variables v* and u* can then be obtained by $[v^{*T}\ u^{*T}]^T = (g^{*-1}(s)\dot{g}^*(s))^{\vee}$.

If the reference configuration happens to be a straight cylindrical rod with s as the arc length along it, then $v^* = [0\ 0\ 1]^T$ and $u^*(s) = [0\ 0\ 0]^T$.

B. Equilibrium Equations

One can the write the equations of static equilibrium for an arbitrary section of rod as shown in FIG. 3. The internal force and moment vectors (in global frame coordinates) are denoted by n and m, the applied force distribution per unit of s is f, and the applied moment distribution per unit of s is l. Taking the derivative of the static equilibrium conditions with respect to s, one arrives at the classic forms of the equilibrium differential equations for a special Cosserat rod, $$\dot{n}(s) + f(s) = 0, \quad (2)$$

$$\dot{m}(s) + \dot{p}(s) \times n(s) + l(s) = 0. \quad (3)$$

C. Constitutive Laws

The difference between the kinematic variables in the rod's reference state and those in the deformed state can be directly related to various mechanical strains. For instance, transverse shear strains in the body-frame x and y directions correspond to $v_x - v_x^*$ and $v_y - v_y^*$ respectively, while axial elongation or stretch in the body-frame z direction corresponds to $v_z - v_z^*$. Similarly, bending strains about the local x and y axes are related to $u_x - u_x^*$ and $u_y - u_y^*$ respectively, while torsional strain about the local z axis is related to $u_z - u_z^*$.

One can use linear constitutive laws to map these strain variables to the internal forces and moments. Assuming that the x and y axes of g* are aligned with the principal axes of the cross section, one obtains $$n(s) = R(s)D(s)(v(s) - v^*(s)),$$

$$m(s) = R(s)C(s)(u(s) - u^*(s)), \quad (4)$$

where $$D(s)=\text{diag}(GA(s),GA(s),EA(s)), \text{ and}$$

$$C(s)=\text{diag}(EI_{xx}(s),EI_{yy}(s),EI_{xx}(s)+EI_{yy}(s)), \quad (5)$$

where A(s) is the area of the cross section, E(s) is Young's modulus, G(s) is the shear modulus, and $I_{xx}(s)$ and $I_{yy}(s)$ are the second moments of area of the tube cross section about the principal axes. (Note that $I_{xx}(s)+I_{yy}(s)$ is the polar moment of inertia about the centroid.) One can use these linear relationships here because they are notationally convenient and accurate for many continuum robots, but the Cosserat rod approach does not require it.

D. Explicit Model Equations

Equations (2) and (3) can then be written in terms of the kinematic variables using equation (4), their derivatives, and equation (1). This leads to the full set of differential equations shown below.

$$\dot{p}=Rv$$

$$\dot{R}=R\hat{u}$$

$$\dot{v}=v^*-D^{-1}((\hat{u}D+\dot{D})(v-v^*)+R^T f)$$

$$\dot{u}=\dot{u}^*-C^{-1}((\hat{u}C+\dot{C})(u-u^*)+\hat{v}D(v-v^*)+R^T l) \quad (5)$$

Alternatively, an equivalent system can be obtained using in and n as state variables rather than v and u.

$$\dot{p}=R(D^{-1}R^T n+v^*)$$

$$\dot{R}=R(C^{-1}R^T m+u^*)^-$$

$$\dot{n}=-f$$

$$\dot{m}=-\dot{p}\times n-l \quad (6)$$

Boundary conditions for a rod which is clamped at s=0 and subject to an applied force $F_l$ and moment $L_l$ at s=l would be $R(0)=R_0$, $p(0)=p_0$, $m(l)=L_l$, and $n(l)=F_l$ III. Coupled Cosserat Rod & Tendon Model Having reviewed the classic Cosserat-rod model, the derivation anew model for tendon driven continuum manipulators in accordance with the various embodiments of the invention will now be presented. The derivation uses the Cosserat model of Section II to describe the elastic member and the classic Cosserat model for extensible strings to describe the tendons. For purposes of the model, the string and rod models are coupled together by deriving the distributed loads that the tendons apply to the elastic member in terms of the rod's kinematic variables, and then incorporating these loads into the rod model.

A. Assumptions

Two standard assumptions are employee in the derivation. First, an assumption of frictionless interaction between the tendons and the channel through which they travel. This implies that the tension is constant along the length of the tendon. Frictional forces are expected to increase as the curvature of the robot increases due to larger normal forces, but the assumption of zero friction is valid if low friction materials are used, which is the case for the experimental prototype discussed below. Second, the locations of the tendons within the cross section of the robot are assumed not to change during the deformation. This assumption is valid for designs which use embedded sleeves or channels with tight tolerances, as well as designs which use closely spaced tendon guide portions.

B. Tendon Kinematics

One can separate the terms f and l in the equations in (5) into truly external distributed loads, $f_e$ and $l_e$, and distributed loads due to tendon tension, $f_t$ and $l_t$.

$$f=f_e+f_t$$

$$l=l_e+l_t. \quad (7)$$

In order to derive $f_t$ and $l_t$, one starts by defining the path in which the tendon is routed along the robot length. Note that this path can be defined by channels or tUbes within a homogeneous elastic atructure, or support disks on an elastic member—both of which afford considerable flexibility in choosing tendon routing. In the experimental prototype, many holes are drilled around the periphery of each support disk, allowing easy reconfiguration of tendon path as desired.

Figure 4:
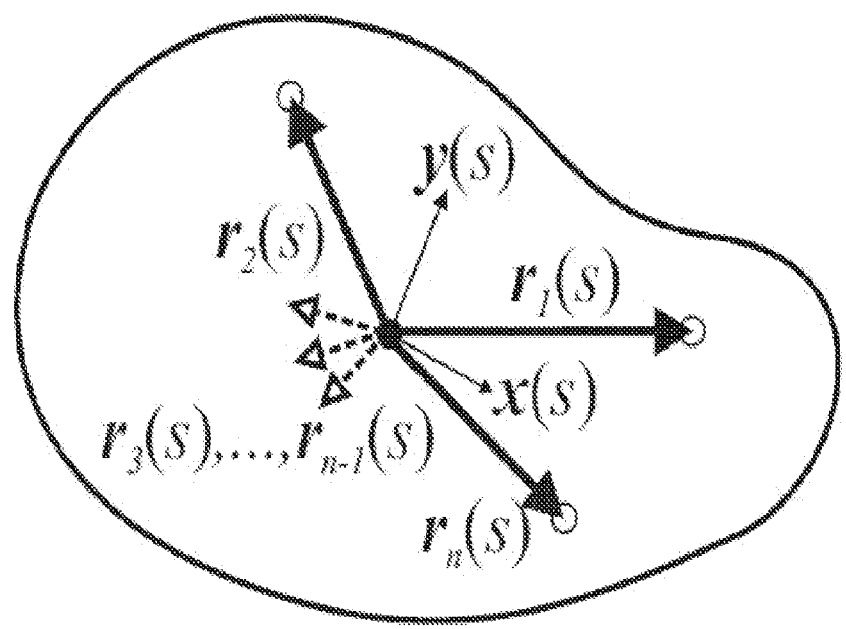
FIG. 4 is an illustration of a general cross section of the continuum robot material or support disk, showing tendon locations.
Figure 5:
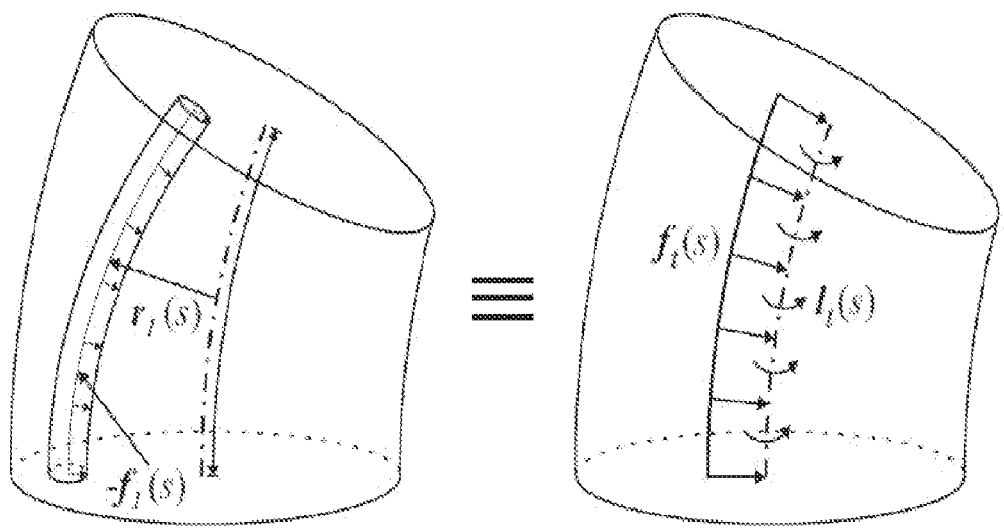
FIG. 5 is an illustration of a small section of a rod showing how the force distribution that the tendon applies to its surrounding medium is statically equivalent to a combination of force and moment distributions on the elastic member itself.

A convenient way to mathematically describe the tendon routing path is to define the tendon location within the robot cross section as a function of the reference parameter s. Thus, the routing path of the $i^{th}$ tendon is defined by two functions $x_i(s)$ and $y_i(s)$ that give the body-frame coordinates of the tendon as it crosses the x-y plane of the attached elastic member frame at s. As shown in FIG. 4, a vector from the origin of the attached frame to the tendon location is then given in attached frame coordinates by $$r_i(s)=[x_i(s)y_i(s)0]^T. \quad (8)$$

The parametric space curve defining the tendon path in the global frame when the robot is in its undeformed reference configuration is then given by $$p_i^*(s)=R^*(s)r_i(s)+p^*(s).$$

Similarly, when the robot is deformed due to tendon tension or external loads, the new tendon space curve will be $$p_i(s)=R(s)r_i(s)+p(s). \quad (9)$$

C. Distributed Forces on Tendons

The governing differential equations for an extensible string can be derived by taking the derivative of the static equilibrium conditions for a finite section. This results in the same equation for the internal force derivative as in equation (2).

$$\dot{n}_i(s)+f_i(s)=0. \quad (10)$$

where $f_i(s)$ is the distributed force applied to the $i^{th}$ tendon per unit of s, and $n_i(s)$ is the internal force in the tendon. In contrast to a Cosserat rod, an ideal string has the defining constitutive property of being perfectly flexible, meaning it cannot support internal moments or shear forces, but only tension which is denoted by $\tau_i$. This requires that the internal force be always tangent to the curve $p_i(s)$. Thus, one can write $$n_i(s)=\tau_i\frac{\dot{p}_i(s)}{\|\dot{p}_i(s)\|}. \quad (11)$$

If friction were present, $\tau_i$ would vary with s, but under the frictionless assumption, it is constant along the length of the tendon. Using (10) and (11) one can derive the following expression for the distributed force on the tendon (see Appendix for Derivation):

$$f_i(s)=-\dot{n}_i=\tau_i\frac{\hat{\dot{p}}_i^2}{\|\dot{p}_i\|^3}\ddot{p}_i. \quad (12)$$

D. Tendon Loads on Elastic Member

One can now write the collective distributed loads $f_t$ and $l_t$ that the tendons apply to the elastic member, in terms of the individual forces on the tendons and their locations in the elastic member cross-section. The total distributed force is equal and opposite to the sum of the individual force distributions on the tendons shown in equation (12), namely, $$f_t = -\sum_{i=1}^{n} f_i.$$

The distributed moment at the elastic member centroid is the sum of the cross products of each moment arm with each force. Thus, $$l_t = -\sum_{i=1}^{n} (p_i - p)^{\wedge} f_i = -\sum_{i=1}^{n} (Rr_i)^{\wedge} f_i.$$

Substituting equation (12), yields $$f_t = -\sum_{i=1}^{n} \tau_i \frac{\hat{\dot{p}}_i^2}{\|\dot{p}_i\|^3} \ddot{p}_i,$$

$$l_t = -\sum_{i=1}^{n} \tau_i (Rr_i)^{\wedge} \frac{\hat{\dot{p}}_i^2}{\|\dot{p}_i\|^3} \ddot{p}_i.$$

(13)

One can then express these total force and moment distributions in terms of the kinematic variables u, v, R and p so that one can substitute them into equations (7) and (5). To do this, one expands $\dot{p}$ and $\ddot{p}$. Differentiating equation (9) twice yields, $$\dot{p}_i = R(\hat{u}r_i + \dot{r}_i + v),$$

$$\ddot{p}_i = R(\hat{u}(\hat{u}r_i + \dot{r}_i + v) + \dot{\hat{u}}r_i + \hat{u}\dot{r}_i + \ddot{r}_i + \dot{v}).$$ (14)

It is noted that $\ddot{p}$ is a function of $\dot{u}$ and $\dot{v}$. Therefore, substituting these results into equation (13), and equation (13) into the rod model equation (5) via equation (7), one can obtain an implicitly defined set of differential equations. Fortunately, the resulting equations are linear in $\dot{u}$ and $\dot{v}$, and it is therefore possible to manipulate them into an explicit form. Rewriting them in this way (such that they are amenable to standard numnical methods) is the topic of the following subsection.

E. Explicit Decoupled Model Equations

The coupled rod & tendon model is given in implicit form by equations (5), (7), (13), and (14). In this subsection, these implicit equations are manipulated into explicit, order, state-vector form. To express the result concisely, some intermediate matrix and vector quantities are defined, starting with equation (14) expressed in body-frame coordinates, i.e.

$$\dot{p}_i^b = \hat{u}r_i + \dot{r}_i + v.$$

$$\ddot{p}_i^b = \hat{u}\dot{p}_i^b + \dot{\hat{u}}r_i + \hat{u}\dot{r}_i + \ddot{r}_i + \dot{v}.$$

Now define Matrices $A_i$, $A$, $B_i$, and $B$, as well as vectors $a_i$, $a$, $b_i$, and $b$, as follows:

$$A_i = -\tau_i \frac{(\hat{\dot{p}}_i^b)^2}{\|\dot{p}_i^b\|^3}, \qquad B_i = \hat{r}_i A_i,$$

$$A = \sum_{i=1}^{n} A_i, \qquad B = \sum_{i=1}^{n} B_i,$$

$$a_i = A_i(\hat{u}\dot{p}_i^b + \hat{u}\dot{r}_i + \ddot{r}_i), \quad b_i = \hat{r}_i a_i,$$

$$a = \sum_{i=1}^{n} a_i, \qquad b = \sum_{i=1}^{n} b_i,$$

to find that $f_t$ and $l_t$ can now be expressed as $$f_t = R\left(a + A\dot{v} + \sum_{i=1}^{n} A_i \hat{u}r_i\right),$$ (15)

$$l_t = R\left(b + B\dot{v} + \sum_{i=1}^{n} B_i \hat{u}r_i\right).$$

The vector terms $\sum_{i=1}^{n} A_i \dot{\hat{u}}r_i$ and $\sum_{i=1}^{n} B_i \dot{\hat{u}}r_i$ are both linear in the elements of $\dot{u}$. Therefore, it is possible to express them both by equivalent linear operations on $\dot{u}$. That is, one can define matrices G and H as $$G = \sum_{i=1}^{n} [\, A_i \hat{e}_1 r_i \quad A_i \hat{e}_2 r_i \quad A_i \hat{e}_3 r_i \,]$$

$$H = \sum_{i=1}^{n} [\, B_i \hat{e}_1 r_i \quad B_i \hat{e}_2 r_i \quad B_i \hat{e}_3 r_i \,]$$

where $e_1$, $e_2$, and $e_3$ are the standard basis vectors [1 0 0], [0 1 0], and [0 0 1]. Then, equation (15) becomes $$f_t = R(a + A\dot{v} + G\dot{u}).$$

$$l_t = R(b + B\dot{v} + H\dot{u}).$$

Substituting tendon load expressions into the last two equations in (5) and rearranging them provides $$(D+A)\dot{v} + G\dot{u} = d$$

$$B\dot{v} + (C+H)\dot{u} = c$$

where the vectors c and d are functions of the state variables as shown below.

$$d = D\dot{v}^* - (\hat{u}D + \dot{D})(v - v^*) - R^T f_e - a$$

$$c = C\dot{u}^* - (\hat{u}C + \dot{C})(u - u^*) - \hat{v}D(v - v^*) - R^T l_e - b.$$

One can now easily write the governing equations as $$\dot{p} = Rv$$

$$\dot{R} = R\hat{u}$$

$$\begin{bmatrix} \dot{v} \\ \dot{u} \end{bmatrix} = \begin{bmatrix} D+A & G \\ B & C+H \end{bmatrix}^{-1} \begin{bmatrix} d \\ c \end{bmatrix}.$$ (17)

Noting that the quantities on the right hand side of equation (17) are merely functions of the state variables and system inputs (u, R, $\tau_n$, $f_e$ and $l_e$) one arrives at a system of differential equations in standard explicit form, describing the shape of a continuum robot with any number of generally routed tendons and with general external loads applied.

This system can be solved by any standard numerical integration routine for systems of the form $\dot{y}=f(s,y)$. The required matrix inverse may be calculated (either numerically or by obtaining a closed form inverse) at every integration step, or one could alternatively rewrite the equations as a system with a state dependent mass matrix on the left hand side and use any standard numerical method for solving $M(y,s)\dot{y}=f(s,y)$. For purposes of the simulations and experiments in accordance with the various embodiments of the invention, numerically inversion is used.

F. Boundary Conditions

When tendon i terminates at $s=l_i$ along the length of the robot, it applies a point force to its attachment point equal and opposite to the internal force in the tendon given by equation (11). Thus, the point force vector is given by $$F_i = -n_i(l_i) = -\tau_i \frac{\dot{p}_i(l_i)}{\|\dot{p}_i(l_i)\|} \quad (18)$$

With a moment arm of $p_i(l_i)-p(l_i)$, this force creates a point moment $L_i$ at the elastic member centroid of, $$L_i = -\tau_i (R(l_i) r_i(l_i))^\wedge \frac{\dot{p}_i(l_i)}{\|\dot{p}_i(l_i)\|}. \quad (19)$$

If at some location $s=\sigma$, point loads $F(\sigma)$ and $L(\sigma)$ (resulting from tendon terminations or external loads) are applied to the elastic member, the internal force and moment change across the boundary $s=\sigma$ by, $$n(\sigma^-)=n(\sigma^+)+F(\sigma),$$

$$m(\sigma^-)=m(\sigma^+)+L(\sigma). \quad (20)$$

where $\sigma^-$ and $\sigma^+$ denote locations just before and just after $s=\sigma$. Any combination of external point loads and tendon termination loads can be accommodated in this way.

G. Point Moment Model

Figure 6:
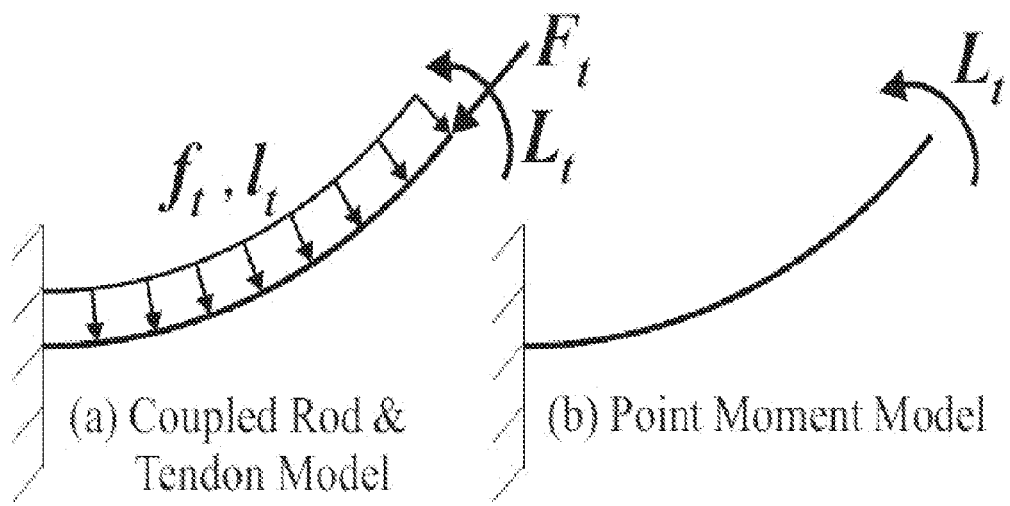
FIG. 6 is an illustration schematically showing (a) the coupled Cosserat rod and tendon approach that includes all of the tendon loads and (b) the point moment approach only includes the attachment moment.

In prior tendon robot models, tendon actuation has often been modeled by simply applying the pure point moment in equation (19) to an elastic member model at the location where each tendon is attached, without considering the point force at the attachment point and the distributed tendon loads along the length (see FIG. 6). This approach is convenient because it allows one to use the classical Cosserat rod equations by simply applying boundary conditions that take into account the tendon termination moments.

This approximation for planar robots is justified since the efects of the point force and the distributed loads effectively "cancel" each other, leaving only the point moment. Thus, as shown in FIG. 1 this approach yields almost exactly the same final shape as the full coupled model when the rohot deformation occurs in a plane.

However, as shown in FIG. 1, the two approaches diverge as the robot shape becomes increasingly non-planar due to a transverse load at the tip. In Section V, an investigation of the accuracy of both approaches a set of experiments on a prototype robot is provided.

IV. Dynamic Model

Based on the coupled rod and tendon model presented above for static continuum robot deformations, a model for the dynamics of a continuum robot with general tendon routing is derived. Such a model will be useful for analyzing the characteristics of specific designs as well as the development of control algorithms similar to those derived for planar robotswith straight tendons. As shown below, adding the necessary dynamic terms and equations results in a hyperbolic system of partial differential equations, which can be expressed in the standard form $$y_t = f(s, t, y, y_s), \quad (21)$$

where a subscript s or t is used in this section to denote partial derivatives with respect to the reference parameter s and time t respectively.

Two new vector variables are introduced, q and w, which are the body frame linear and angular velocity of the rod at s. These are analogous to u and v respectively, but are defined with respect to time instead of arc length. Thus, $$p_t = Rq \; R_t = R\hat{w}. \quad (22)$$

Recalling from equations in (5) that $$p_s = Rv \; R_s = R\hat{u}, \quad (23)$$

and using the fact that $p_{st}=p_{ts}$ and $R_{st}=R_{ts}$ one can derive the following compatibility equations, $$u_t = w_s + \hat{u}w \; v_t = q_s + \hat{u}q - \hat{w}v_s \quad (24)$$

Equations (2) and (3) describe the static equilibrium of the rod. To describe dynamics, one can add the time derivatives of the linear and angular momentum per unit length in place of the zero on the right hand side, such that they become, $$\dot{n} + f = \rho A p_u, \quad (25)$$

$$\dot{m} + \dot{p} \times n + l = \partial_t(R\rho Jw), \quad (26)$$

where $\rho$ is the mass density of the rod, A is the cross sectional area of the elastic member, and J is the matrix of second area moments of the cross section. Expanding these and applying the equations in (24) one can obtain a complete system in the form of equation (21), $$p_t = Rq \quad (27)$$
$$R_t = R\hat{\omega}$$
$$v_t = q_s + \hat{u}q - \hat{\omega}v$$
$$u_t = \omega_s + \hat{u}\omega$$
$$q_t = \frac{1}{\rho A}(D(v_s - v_s^*) + (\hat{u}D + D_s)(v - v^*) + R^T(f_e + f_t) - \rho A \hat{\omega} q)$$
$$\omega_t = (\rho J)^{-1}$$
$$(C(u_e - u_s^*) + (\hat{u}C + C_s)(u - u^*) + \hat{v}D(v - v^*) + R^T(l_e + l_t) - \hat{\omega}\rho J\omega)$$

where $f_t$ and $l_t$ can be computed using the equations in (16). Typically, conditions at $t=0$ are given for all variables along the length of the robot, and the boundary conditions of Subsection III-F apply for all times.

A. Dynamic Simulation

To illustrate the capability of the equations in (27) to describe the time evolution of the shape of a continuum robot with general tendon routing, the following dynamic simulation of a robot whose elastic member is identical to that of the experimental prototype described in Section V is provided. The robot contains a single tendon routed in a helical where the tendon makes one complete revolution around the shaft as it passes from the base to the tip. This routing path is the same as the one for tendon 5 in the prototype, which is specified in Table 1.

TABLE I

TENDON ROUTING PATHS USED IN EXPERIMENTS

| Tendon (i) | 1 | 2 | 3 | 4 | 5 | 6 |
|---|---|---|---|---|---|---|
| $x_i$ (mm) | 8 | 0 | −8 | 0 | $8\cos(2\pi s/l)$ | refer to (28) |
| $y_i$ (mm) | 0 | 8 | 0 | −8 | $8\sin(2\pi s/l)$ | refer to (28) |

Figure 7:
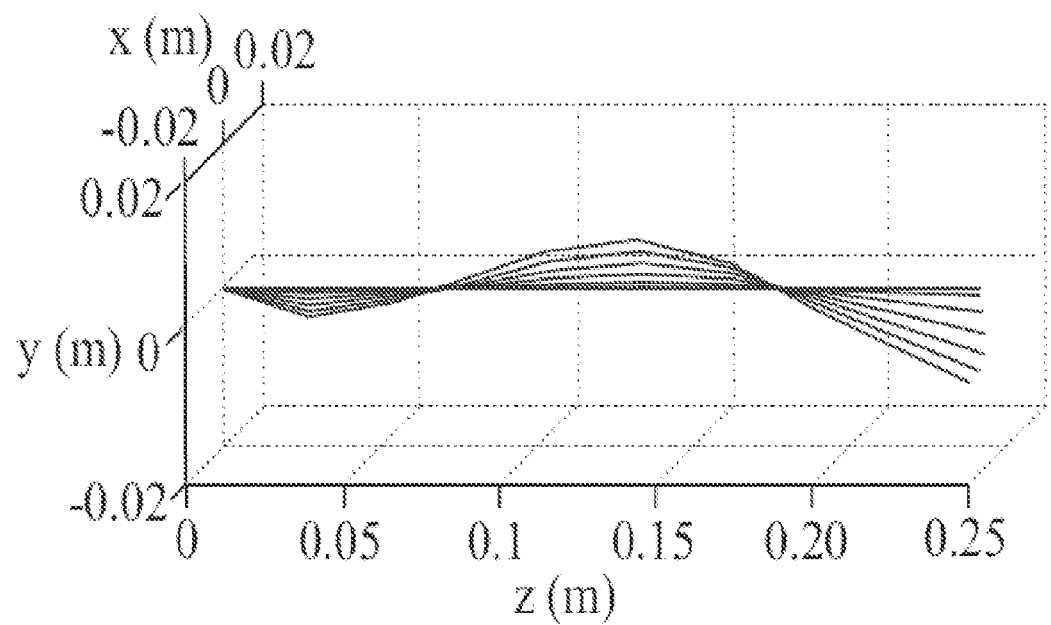
FIG. 7 is an x-y-z plot of the time response of a Continuum robot with a helical tendon is simulated for a step input in tendon tension.

FIG. 7 shows snapshots of the robot backbone shape at millisecond intervals after a step input of 5 Newtons of tendon tension was applied. For the numerical simulation Richtmyerts two-step variant of the Lax-Wendroff finite-difference scheme was implemented.

The maximum length of the time step for any explicit time-marching algorithm for hyperbolic partial differential equations is limited by the Courant-Friedriechs-Lewy condition for stability. This is a fairly restrictive condition for dynamic rod problems because the shear, extension, and torsional vibrations are so fast that a very small is required in order to capture them without the simulation becoming unstable. An active research field in mechanics and computer graphics simulation is to find reduced-order models of rods that are physically accurate and yet capable of being simulated in real-time. This simulation confirms the intuition that the elastic member should move towards a helical very when the helical tendon undergoes a step in tension.

V. Experimental Validation

Figure 8:
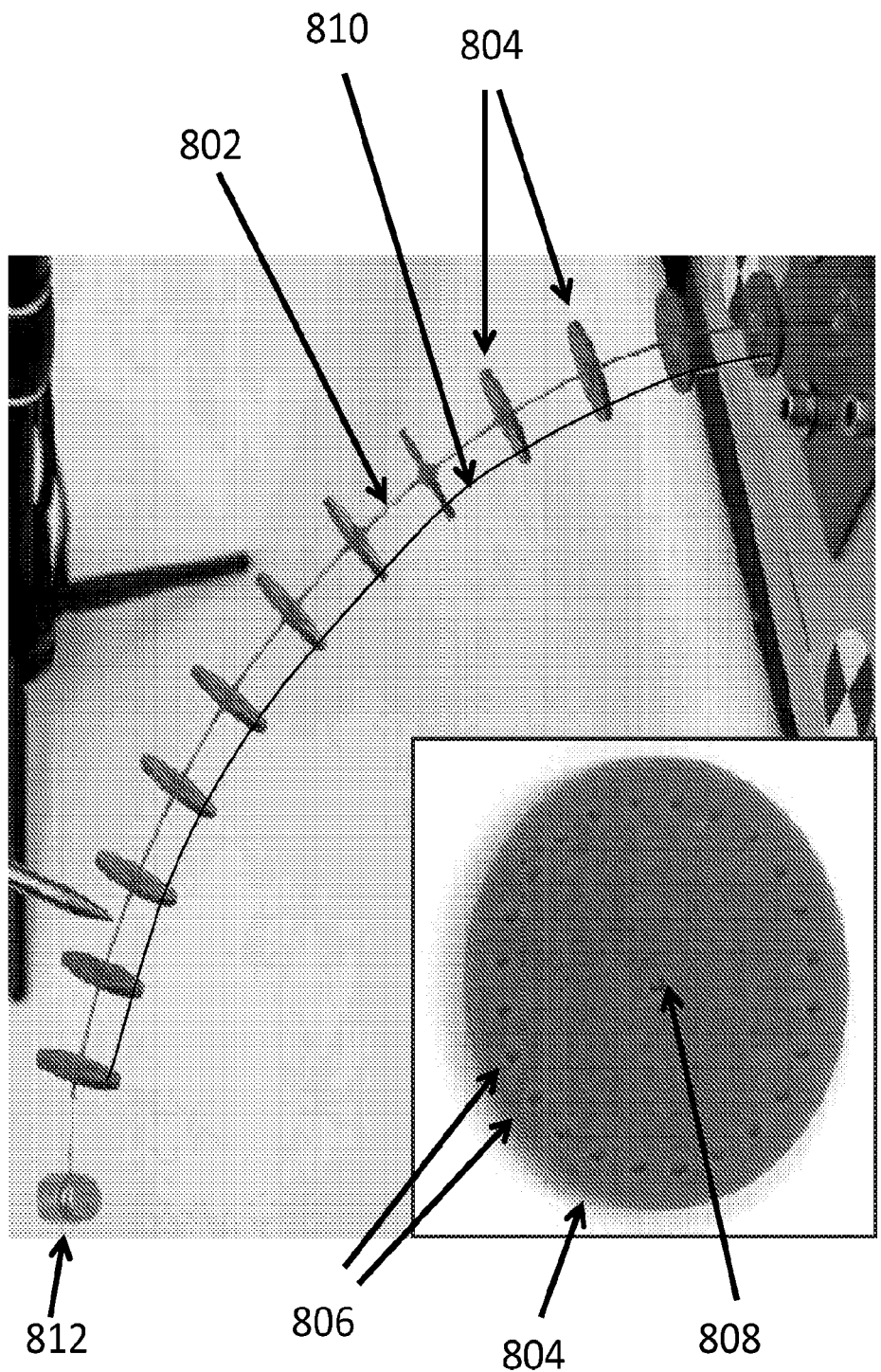
FIG. 8 is shows an exemplary continuum robot configured to operate in accordance with the various embodiments, where the inset shows a detailed view of the tendon guide portions.

Below are described several different experiments conducted using a continuum robot prototype with a variety of tendon paths and external loading conditions applied A. Prototype Constructions A prototype robot in accordance with the various embodiments is shown in FIG. 8. The central elastic member 802 is a spring steel rod (ASTM A228) of length l=242 mm and diameter d=0.8 mm with tendon guide portions 804 consisting of 12 stand-off disks, 20 mm in diameter, spaced 20 mm apart along its length. The disks were laser cut from 1.57 mm thick PTFE filled Delrin plastic to minimize friction with the tendons. As shown in the inset of FIG. 8, 24 small pass-through holes 806 were laser cut in a circular pattern at a radius of 8 mm from the center of each disk. The elastic member rod 802 was passed through the center holes 808 of the disks and each was fixed to it using Loctite 401. For tendons 810, 0.36 mm PTFE coated fiberglass thread were used. Each tendon 810 was run through various pass-through holes along the robot and knotted at the end, after passing through the final support disk. The optimal ratio of tendon support spacing to offset distance from the elastic member was found to be 0.4, and the prototype was designed to exactly match this ratio.

Although the exemplary robot configuration utilizes stand-off disks to provide the tendon guide portions, the various embodiments are not limited in this regard. Rather, any of means of coupling the tendons to the elastic member to cause deformation of the elastic member can be used in the various embodiments. Further, a particular combination of materials, spacing of guide portions, and openings in the guide portions is provided, the various embodiments are not limited in this regard. Rather, any variations on the combination recited above can be used with the various embodiments. Additionally, the methods above can be used with any number of tendons. In such embodiments, the tendons can extend along a same portion of the length of the elastic member or the tendons can extend over different portions of the length of the elastic member, including overlapping portions.

The tendon routing paths can be reconfigured on this robot by "re-threading" the tendons through a different set of holes in the various support disks. The robot's self-weight distribution was measured to be 0.47 N/m, which is enough to cause significant deformation, producing 44 mm of downward deflection at the tip (18% of the total arc length) for zero tendon tension. This weight was incorporated into all model calculations as a distributed force.

B. Experimental Procedure

In each of the following experiments, known tensions were applied to tendons behind the base of the robot by passing the tendons over approximately frictionless pulleys and attaching them to hanging calibration weights. In those cases with applied point loads, weights 812 were also hung from the tip of the robot, as shown in FIG. 8.

In each experiment, a set of 3D elastic member points was collected by manually touching the elastic member with the tip of an optically tracked stylus as shown in FIG. 8. A Micron Tracker 2 H3-60 (Claron Technology, Inc.) was used to track the stylus, which has a specified fiducial measurement accuracy of 0.20 mm.

C. Calibration

The base frame position of the robot can be determined accurately using the optically tracked stylus. The angular orientation of the robot elastic member as it leaves the base support plate is more challenging to measure (Note that the elastic member cannot be assumed to exit exactly normal to the plate due to the tolerance between the elastic member and the hole drilled in the plate, and a 2° angular error in base frame corresponds to an approximately 8 mm tip error when the robot is straight). Also, the effective stiffness of the elastic member was increased due to the constraints of the standoff disks and Loctite adhesive at regular intervals. To account for these uncertainties the effective Young's modulus and the set of XYZ Euler angles ($\alpha$, B, and $\gamma$) describing the orientation of the base frame were calibrated.

The calibration process was accomplished by sorting pre-constrained nonlinear optimization problem to find the set of parameters which minimizes the sum of the positional errors at the tip of the device for the set of 25 experiments with straight tendon paths described in Sec. V-D and Table II.

TABLE II

EXPERIMENTAL TENSIONS AND TIP LOADS

Experiments with Tendons 1-4 (Straight)

| Tension (N) | 0 | 0.98 | 1.96 | 2.94 | 2.94 | 2.94 | 4.91 |
|---|---|---|---|---|---|---|---|
| Tip Load (N) | 0 | 0 | 0 | 0 | 0.098 | 0.196 | 0 |

Experiments with Tendon 5 (Helical)

| Tension (N) | 0.98 | 1.96 | 2.94 | 4.91 | 4.91 | 4.91 | 6.87 |
|---|---|---|---|---|---|---|---|
| Tip Load (N) | 0 | 0 | 0 | 0 | 0.098 | 0.196 | 0 |

Experiments with Tendon 6 (Polynomial)

| Tension (N) | 1.50 | 2.46 | 3.66 | 4.91 | 4.91 |
|---|---|---|---|---|---|
| Tip Load (N) | 0 | 0 | 0 | 0 | 0.0196 |

In other words, for the parameter set $P=\{E, \alpha, B, \gamma\}$:

$$P_{cal} = \underset{P}{\mathrm{argmin}}\left(\sum_{k=1}^{25} e_k\right)$$

where $e_k = \|P_{model}^{(I)} - P_{data}^{(I)}\|_k$ is the Euclidean distance between the model tip prediction and the data in experiment k. To implement this minimization, the Nelder-Meade simplex algorithm was used.

To ensure fair comparison of the coupled model and the point moment model, the calibration procedure was performed separately for each model. Results are shown in Table III.

TABLE III

NOMINAL AND CALIBRATED PARAMETERS

| Parameter | Nominal Value | Calibrated Value (Point Moment Model) | Calibrated Value (Coupled Model) |
|---|---|---|---|
| E (GPa) | 210 | 227.9 | 229.6 |
| α (deg) | 180 | 177.7 | 177.9 |
| β (deg) | 0 | 2.2 | 2.2 |
| γ (deg) | −90 | −89.6 | −89.7 |

Note that the similarity in calibrated Euler angles and their low deviation from nominal provides confidence that the correct base frame was obtained for both models. It is also important to note that the models contain the same number of parameters, no a fair comparison can be made. As expected, the calibrated values for Young's modulus are higher than the nominal value of 210 GPa for spring steel, due to the increased stiffness provided by the disks and glue. Poisson's ratio was held constant at $v=0.3125$ during calibration so that the shear modulus was correctly scaled relative to Young's modulus.

D. Straight Tendon Results and Model Comparison

Table I details the location of the tendon routing paths used in the experiments in terms of $x_i(s)$ and $y_i(s)$ as defined in (8). Twenty-five (25) experiments were performed (detailed in Table II) with straight tendon paths in order to compare the accuracy of the new coupled model with that of the point moment model. The tip error statistics for both models with calibrated parameters is detailed in Table IV.

TABLE IV

MODEL TIP ERRORS FOR STRAIGHT TENDON EXPERIMENTS

| Tip Error Statistics (mm) | mean | std. dev. | min | max |
|---|---|---|---|---|
| 13 Cases with In-Plane Loads | | | | |
| Point Moment Model | 3.5 | 1.4 | 1.2 | 5.6 |
| Coupled Model | 3.1 | 1.3 | 0.3 | 5.3 |
| 12 Cases with Out-of-Plane Loads | | | | |
| Point Moment Model | 9.8 | 5.5 | 1.7 | 16.2 |
| Coupled Model | 4.1 | 2.1 | 0.6 | 7.9 |

Figure 9:
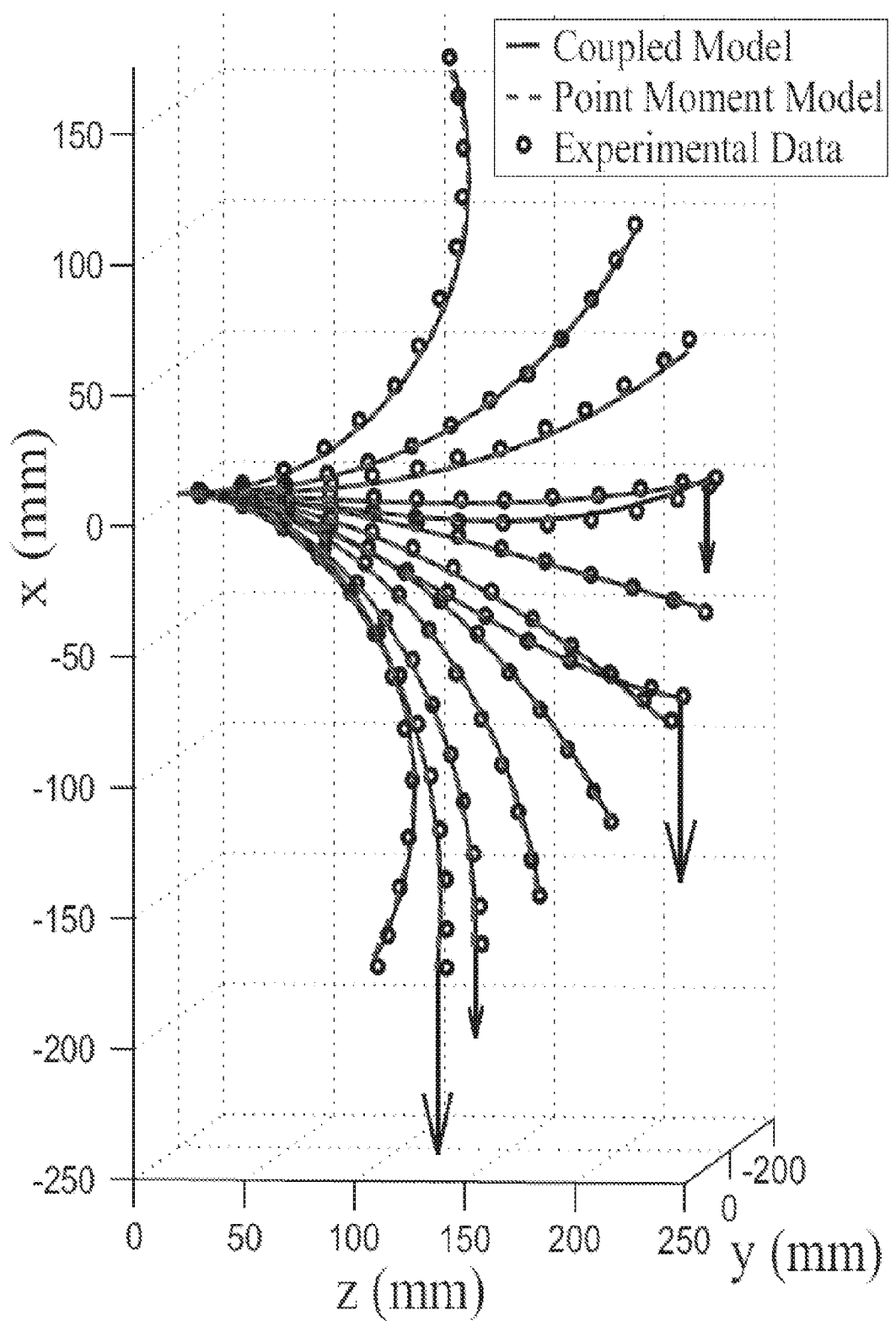
FIG. 9 is an x-y-z plot of the actual and simulated result plane loading of an exemplary continuum robot using a straight tendon.
Figure 10:
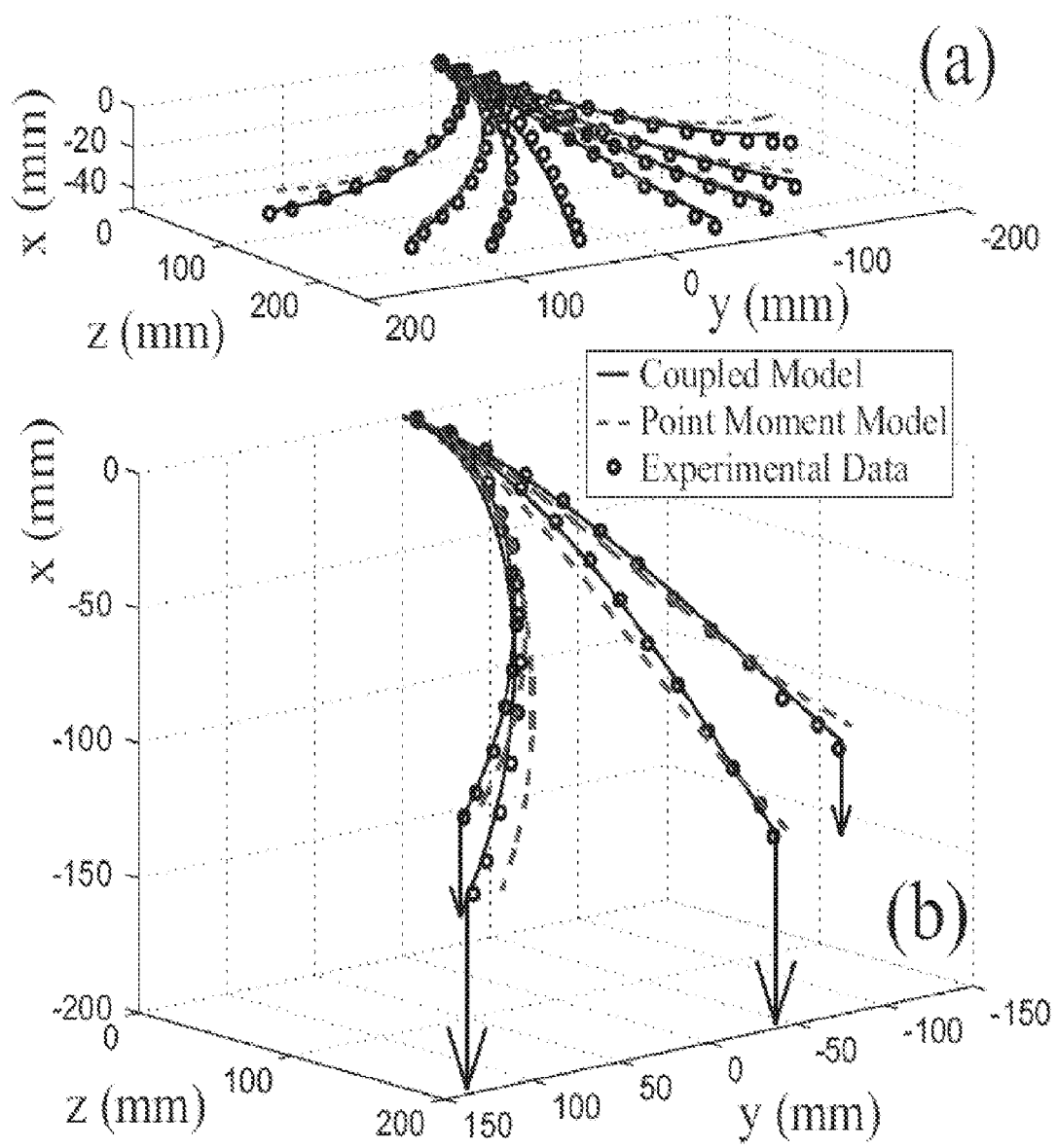
FIG. 10 is an x-y-z plot of the actual and simulated result of out-of-plane loading of an exemplary continuum robot using a straight tendon.

The results for in-plane loading are accurate for both models, as shown in FIG. 9. FIG. 9 is an x-y-z plot of the actual and simulated result of in-plane loading of an exemplary continuum robot using a straight tendon. Shown in FIG. 9 are the 13 experimental cases with in-plane external loads. The tendons on the top and bottom of the robot (tendons 1 and 3) were tensioned and vertical tip loads were applied in four of the cases. Distributed gravitational loading is present in every case. As detailed in Table IV, both the coupled model and the point moment model are accurate and nearly identical for in-plane loads. In contrast, for out-of-plane loads, the coupled model provides more accurate predictions, as shown in FIG. 10. FIG. 10 is an x-y-z plot of the actual and simulated result of out-of-plane loading of an exemplary continuum robot using a straight tendon. Pictured in FIG. 10 are the twelve experimental cases with out-of-plane external loads. The tendons on the left and right of the robot (tendons 2 and 4) were tensioned. (a) Distributed loading (robot self-weight) applied, (b) additional tip loads applied. As detailed in Table IV, the data agrees with the coupled model prediction, but the point moment model becomes inaccurate as the out-of-plane load increases, and as the curvature increases.

With calibrated parameters, the mean tip error over all 25 straight tendon experiments was 3.6 mm for the coupled model. This corresponds to 1.5% of the total arc length of the robot. Note that experimental data points lie close to the model prediction along the entire robot length, and the error increases gradually along the robot length, no that tip error normalized by the robot length is a reasonable metric for the accuracy of the model.

E. A High-Tension, Large-Load, Straight Tendon Experiment

Figure 11:
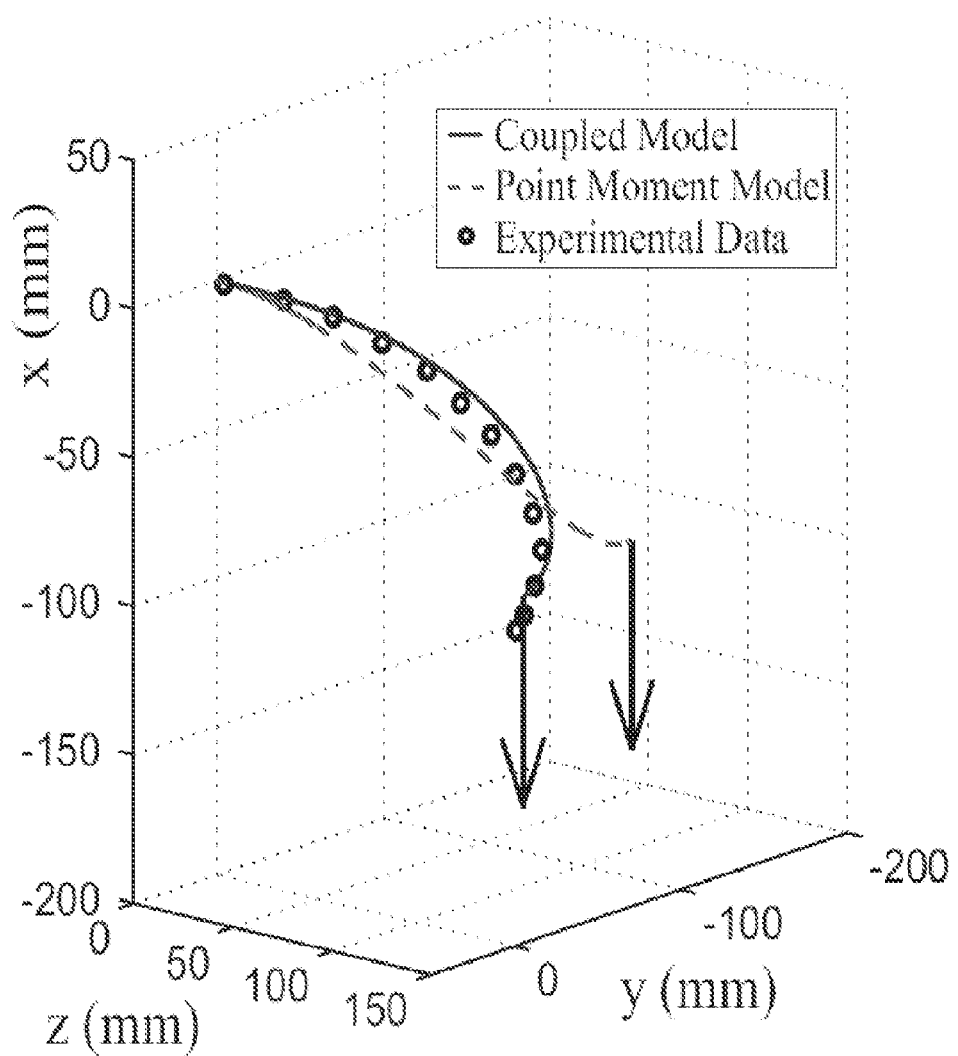
FIG. 11 is an x-y-z plot of the actual and simulated result of out-of-plane loading for an exemplary continuum robot using a straight tendon and high tension.

Also performed was one additional straight tendon experiment to see how the two approaches compare for a case of large tension and large out-of-plane load, similar to the case which is simulated in FIG. 1. Tendon 4 was tensioned to 6.38 N and a downward tip force of 0.196 N was applied. The resulting data and model predictions are shown in FIG. 11. FIG. 11 is an x-y-z plot of the actual and simulated result of out-of-plane loading for an exemplary continuum robot using a straight tendon and high tension. As illustrated in FIG. 11, the two models produce very different results. FIG. 11 shows that the coupled model prediction lies much closer to the data. Here, the tip error of the point moment model is 57 mm (23.5% of robot length), while the coupled model tip error is 12.8 mm (5.3% of robot length).

F. Experiments with Helical Tendon Routing

Figure 12A:
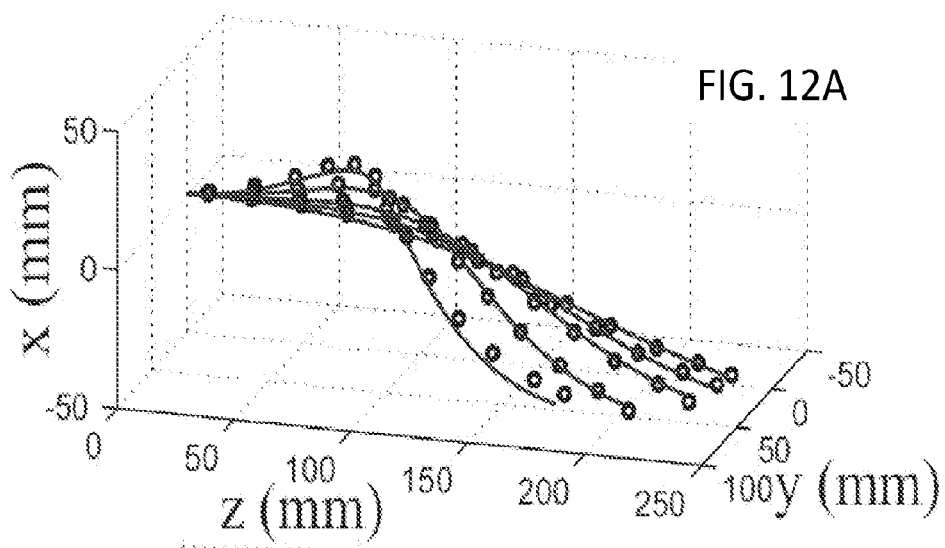
FIG. 12A is an x-y-z plot of the actual and simulated results of operation of an exemplary continuum robot using a helical tendon without a load.
Figure 12B:
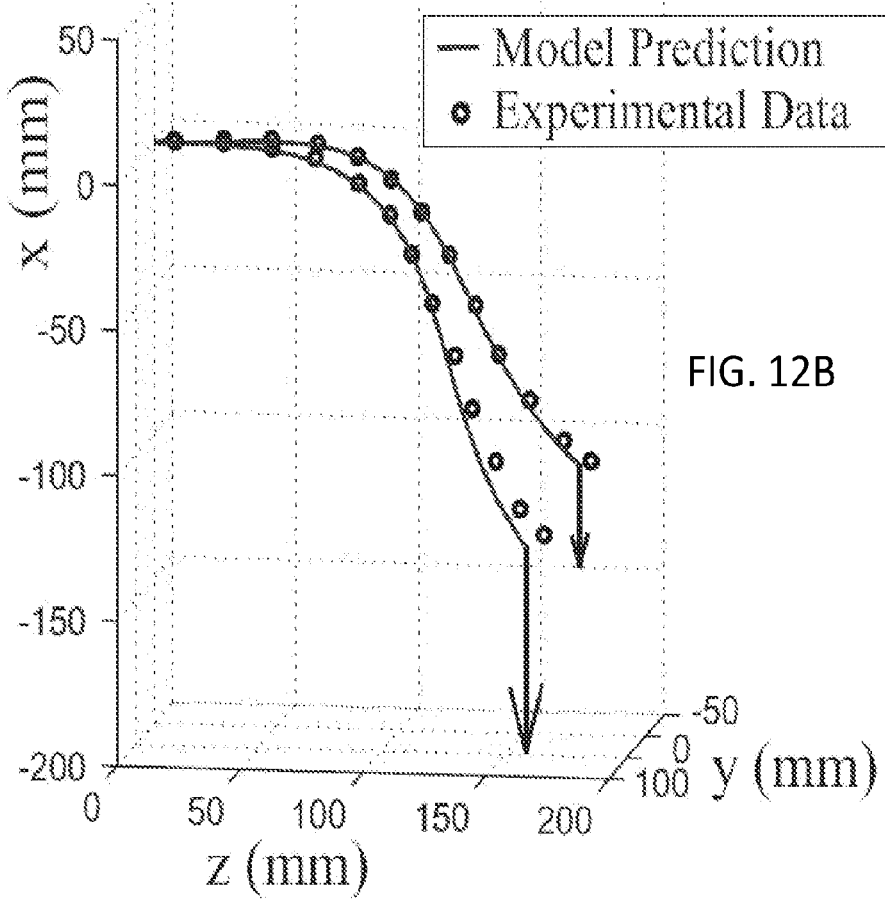
FIG. 12B is an x-y-z plot of the actual and simulated results of operation of an exemplary continuum robot using a helical tendon with a tip load.

To explore more complex tendon routing, helical routing paths were also evaluated. As given in Table I, the helical routing path winds through one complete revolution as it traverses the robot from base to tip. The tensions and tip loads for these experiments are detailed in Table II. Using the parameters calibrated from the previous straight tendon dataset, the resulting data and model predictions are plotted in FIGS. 12A and 12B. FIG. 12A is an x-y-z plot of the actual and simulated results of operation of an exemplary continuum robot using a helical tendon without a load. FIG. 12B is an x-y-z plot of the actual and simulated results of operation of an exemplary continuum robot using a helical tendon with a tip load. As seen from Table V, the model agrees with the data with a mean tip error of 5.5 mm. The small increase in error over the straight tendon cases may be due to increased frictional forces since the tension for the helical cases was higher.

TABLE V

COUPLED MODEL TIP ERRORS FOR NON-STRAIGHT TENDON EXPERIMENTS

| | mean | std. dev. | min | max |
|---|---|---|---|---|
| Tendon 5 (Helical) | 5.5 | 2.7 | 1.9 | 10.0 |
| Tendon 6 (Polynomial) | 4.6 | 1.9 | 2.7 | 7.2 |

G. Experiments with Polynomial Tendon Routing

Figure 13:
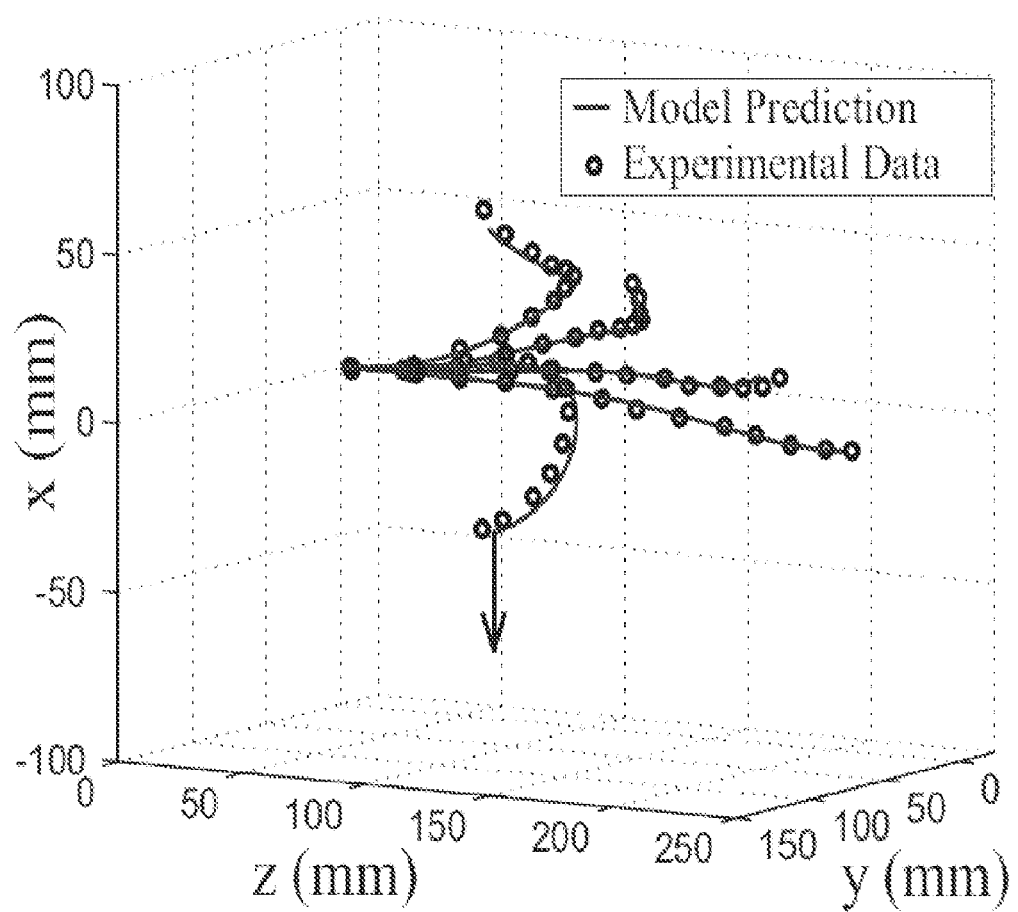
FIG. 13 is an x-y-z plot of the actual and simulated results of operation of an exemplary continuum robot using a polynomial tendon with tip loads according to Table II.

In order to further illustrate the model's generality, an additional experiment with a general curved tendon routing choice was performed. In particular, the routing path variables were parameterized by two trigonometric functions whose arguments are defined by a polynomial function of degree 4 as follows:

$$x_6(s)=8\cos(5887s^4-2849s^3+320s^2+6s)$$

$$y_6(s)=8\sin(5887s^4-2849s^3+320s^2+6s), \quad (28)$$

where s is in meters and $x_6$ and $y_6$ are in millimeters. This routing path starts at the top of the robot, wraps around to the right side for most of the length, and then returns to the top at the end of the robot. The tensions and loads are given in Table II, and the results are detailed in Table V and illustrated in FIG. 13. FIG. 13 is an x-y-z plot of the actual and simulated results of operation of an exemplary continuum robot using a polynomial tendon with tip loads according to Table II. The coupled model's predictions agree with the data, with a mean tip error of 4.6 mm. This set of experiments confirms the coupled model's ability to handle an arbitrary tendon routing choices.

H. Sources of Error

The largest source of measurement is likely the procedure of manually placing the tip of the on the robot during data capture. It is estimated that this uncertainty is at most 2 mm. In general, the largest model errors occurred when the tendons were under the greatest tension. This agrees with the intuition that effects of static friction should become more significant as the tension and curvature increase, However, the low overall errors suggest that neglecting static friction is justifiable for this prototype.

VI. System Configuration

Figure 14:
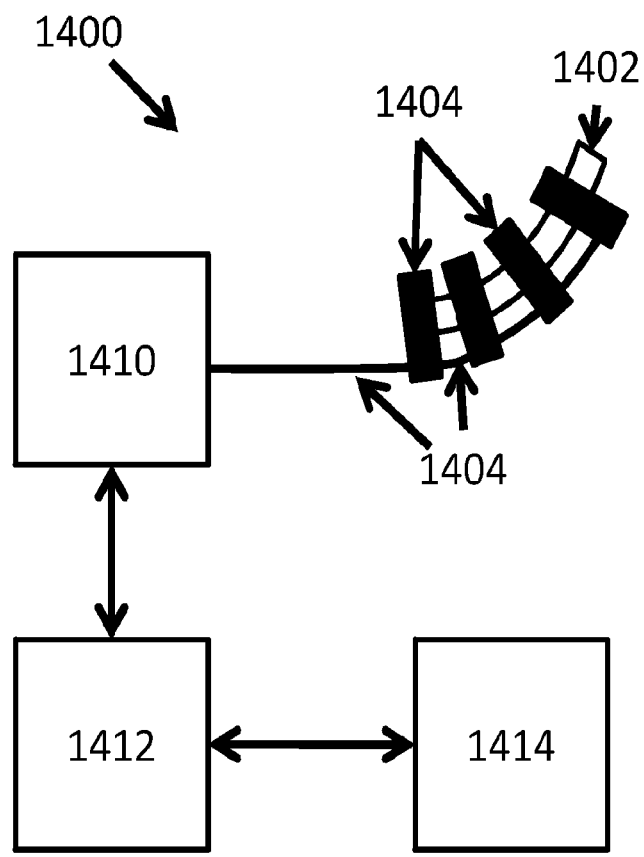
FIG. 14 is a schematic illustration of a continuum robot system 1400 in accordance with the various embodiments.

Accordingly, in the view of the foregoing, the equations above can be integrated into a continuum robot system, as shown in FIG. 14. FIG. 14 is a schematic illustration of a continuum robot system 1400 in accordance with the various embodiments. The system 1400 can include a continuum robot 1402 similar to that illustrated in FIG. 8. That is, the continuum robot 1402 can include an elastic member or backbone 1404 having one end or portion coupled to a support or base (not shown), a number of guide portions 1406, and at least one tendon 1408 extending through the guide portions and defining a tendon path, as described above. The system 1402 can further include an actuator/sensor 1410 for applying a force or tension and for ascertaining a current tension on the tendon 1408 to the tendon 1408. The system 1400 can also include a control system 1412 for operating the system 1400, which can include a computing device.

The system can have at least two modes of operation. In a first mode of operation, the actuator/sensor 1410 can generate signals indicative of a current tension on the tendon 1408. This signal can be recited by the control system 1412. The control system 1412 can then use the equations described above, particularly the governing equations at (17), to estimate a current or resulting shape of the member 1404. In particular, the governing equations at (17) can be solved to extract the shape of the member 1404. Additional sensors 1414, such as video sensors, can also be coupled to the control system 1412 to allow verification of this estimated shape. In a second mode of operation, the control system 1412 can also use the equations described above, particularly the governing equations at (17), to determine an amount of tension required for the member 1404 to achieve a desired shape. Thereafter, the control system 1412 can cause the actuator/sensor 1410 to adjust the tension on the tendon 1408. The additional sensors 141 can then be used to verify that the target shape has been achieved.

Using these two modes of operation, it is then possible to control the robot 1402 to perform various types of tasks, as the equations above allow one to detect and adjust the configuration of the robot 1402 in real-time based on measurement and adjustment of the tension of the tendon 1408. That is, a robot with increased dexterity can be provided. Such a robot can be useful for various applications. In particular, such robots would be useful for carry out procedures in confined spaces, as the increased dexterity would allow the user to maneuver the tip around obstructions in such spaces. For example, such robots could be used to reduce the invasiveness of some existing surgical procedures which currently cannot be performed using conventional robotic tools. Such procedures in transnasal skull base surgery, lung interventions, cochlear implantation procedures, to name a few. However, the various embodiments are not limited in this regard and the various methods and systems described herein can be used for any other procedure in which increased dexterity of the robot is desired or required.

Figure 15:
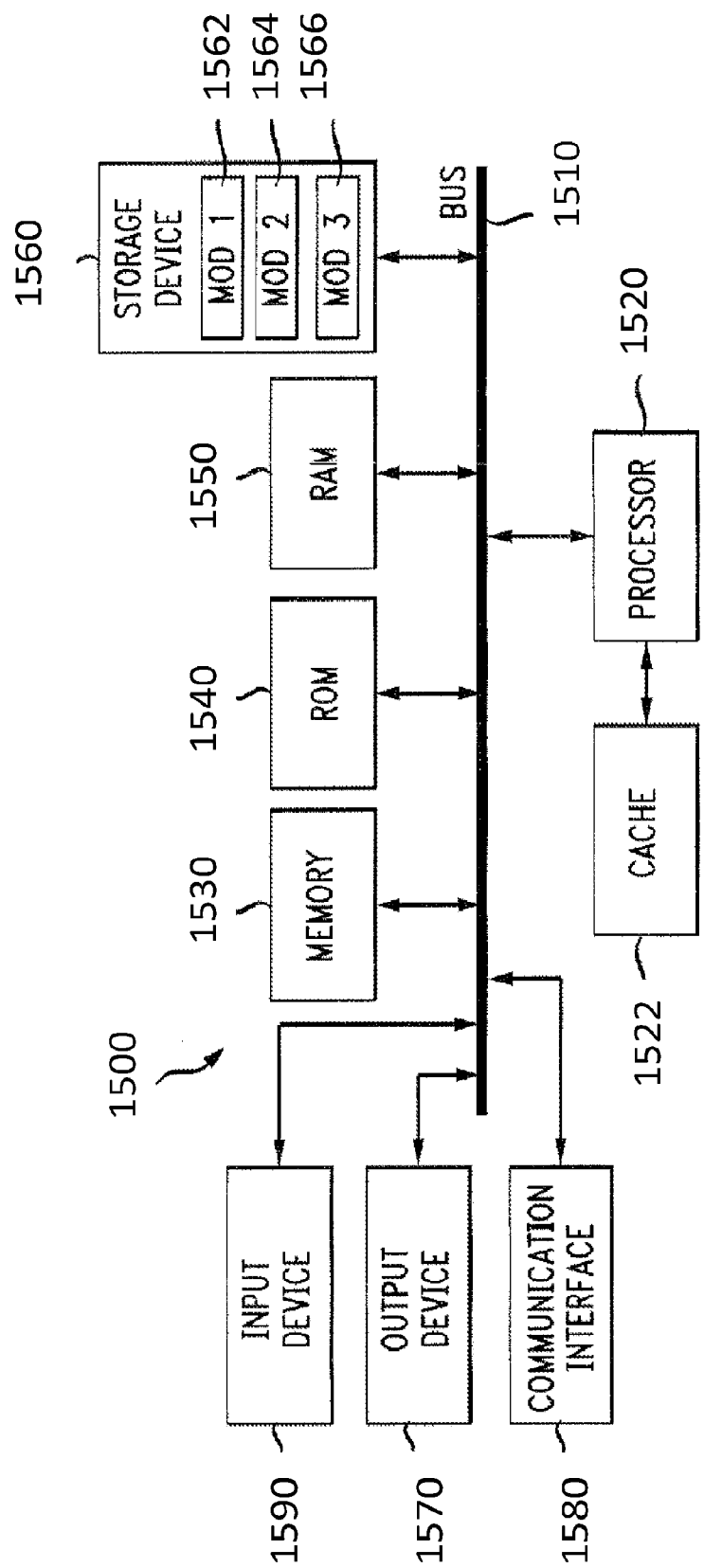
FIG. 15 shows an exemplary system 1500 includes a general-purpose computing device 1500 for performing methods and processes in accordance with the various embodiments.

Turning now to FIG. 15, this is shown an exemplary system 1500 includes a general-purpose computing device 1500 for performing one or more of the various methods and processes described above. System 1500 includes a processing unit (CPU or processor) 1520 and a system bus 1510 that couples various system components including the system memory 1530 such as read only memory (ROM) 1540 and random access memory (RAM) 1550 to the processor 1520. The system 1500 can include a cache 1522 of high speed memory connected directly with, in close proximity to, or integrated as part of the processor 1520. The system 1500 copies data from the memory 1530 and/or the storage device 1560 to the cache 1522 for quick access by the processor 1520. In this way, the cache 1522 provides a performance boost that avoids processor 1520 delays while waiting for data. These and other modules can be configured to control the processor 1520 to perform various actions. Other system memory 1530 may be available for use as well. The memory 1530 can include multiple different types of memory with different performance characteristics. It can be appreciated that the disclosure may operate on a computing device 1500 with more than one processor 1520 or on a group or cluster of computing devices networked together to provide greater processing capability. The processor 1520 can include any general purpose processor and a hardware module or software module, such as module 1 1562, module 2 1564, and module 3 1566 stored in storage device 1560, configured to control the processor 1520 as welt as a special-purpose processor where software instructions are incorporated into the actual processor design. The processor 1520 may essentially be a completely self-contained computing system, containing multiple cores or processors, a bus, memory controller, cache, etc. A multi-core processor may be symmetric or asymmetric.

The system bus 1510 may be any of several types of bus structures including a memory bus or memory controller, a peripheral bus, and a local bus using any of a variety of bus architectures. A basic input/output (BIOS) stored in ROM 1540 or the like, may provide the basic routine that helps to transfer information between elements within the computing device 1500, such as during start-up. The computing device 1500 further includes storage devices 1560 such as a hard disk drive, a magnetic disk drive, an optical disk drive, tape drive or the like. The storage device 1560 can include software modules 1562, 1564, 1566 for controlling the processor 1520.

Other hardware or software modules are contemplated. The storage device 1560 is connected to the system bus 1510 by a drive interface. The drives and the associated computer readable storage media provide nonvolatile storage of computer readable instructions, data structures, program modules and other data for the computing device 1500. In one aspect, a hardware module that performs a particular function includes the software component stored in a tangible and/or intangible computer-readable medium in connection with the necessary hardware components, such as the processor 1520, bus 1510, display 1570, and so forth, to carry out the function. The basic components are known to those of skill in the art and appropriate variations are contemplated depending on the type of device, such as whether the device 1500 is a small, handheld computing device, a desktop computer, or a computer server.

Although the exemplary embodiment described herein employs the hard disk 1560, it should be appreciated by those skilled in the art that other types of computer readable media which can store data that are accessible by a computer, such as magnetic cassettes, flash memory cards, digital versatile disks, cartridges, random access memories (RAMs) 1550, read only memory (ROM) 1540, a cable or wireless signal containing a bit stream and the like, may also be used in the exemplary operating environment. Tangible, non-transitory computer-readable storage media expressly exclude media such as energy, carrier signals, electromagnetic waves, and signals per se.

To enable user interaction with the computing device 1500, an input device 1590 represents any number of input mechanisms, such as a microphone for speech, a touch-sensitive screen for gesture or graphical input, keyboard, mouse, motion input, speech and so forth. An output device 1570 can also be one or more of a number of output mechanisms known to those of skill in the art. In some instances, multimodal systems enable a user to provide multiple types of input to communicate with the computing device 1500. The communications interface 1580 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 1520. The functions these blocks represent may be provided through the use of either shared or dedicated hardware, including, but not limited to, hardware capable of executing software and hardware, such as a processor 1520, that is purpose-built to operate as an equivalent to software executing on a general purpose processor. For example the functions of one or more processors presented in FIG. 15 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 1540 for storing software performing the operations discussed below, and random access memory (RAM) 1550 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 1500 shown in FIG. 15 can practice all or part of the recited methods, can be a part of the recited systems, and/or can operate according to instructions in the recited tangible computer-readable storage media. Such logical operations can be implemented as modules configured to control the processor 1520 to perform particular functions according to the programming of the module. For example, FIG. 15 illustrates three modules Mod1 1562, Mod2 1564 and Mod3 1566 which are modules configured to control the processor 1520. These modules may be stored on the storage device 1560 and loaded into RAM 1550 or memory 1530 at runtime or may be stored as would be known in the art in other computer-readable memory locations.

VII. Derivation Appendix

A. Nomenclature

*: Denotes a variable in the reference state.
˙: Denotes a derivative with respect to s.
^: Converts $\mathbb{R}^3$ to so(3) and $\mathbb{R}^6$ to se(3):

$$\hat{u} = \begin{bmatrix} 0 & -u_z & u_y \\ u_z & 0 & -u_x \\ -u_y & u_x & 0 \end{bmatrix},$$

$$\begin{bmatrix} v \\ u \end{bmatrix}^{\wedge} = \begin{bmatrix} 0 & -u_z & u_y & v_x \\ u_z & 0 & -u_x & v_y \\ -u_y & u_x & 0 & v_z \\ 0 & 0 & 0 & 0 \end{bmatrix}$$

∨: Inverse of the ^ operation. $(\hat{u})^{\vee} = u$.
s: $\in \mathbb{R}$—Reference length parameter.
p(s): $\in \mathbb{R}^3$—Position of the robot backbone centroid in global frame coordinates.
R(s): $\in SO(3)$—Orientation of the robot backbone material with iespect to the global frame.
g(s): $\in SE(3)$—Homogeneous transformation containing R(s) and p(s). (The "body frame")
$r_i(s) \in \mathbb{R}^3$: Position of the $i^{th}$ tendon with respect to the body frame. $r_i(s) = [x_i(s)\ y_i(s)\ 0]^T$
$p_i(s)$: $\in \mathbb{R}^3$—Position of the tendon in global frame coordinates. $p_i(s) = R r_i(s) + p(s)$.
u(s): $\in \mathbb{R}^3$—Angular rate of change of g with respect to s in body-frame coordinates. $u = \left(R^T \dot{R}\right)^{\vee}$
v(s): $\in \mathbb{R}^3$—Linear rate of change of q with respect to s expressed in body-frame coordinates. $v = R^T \dot{p}$
n(s): $\in \mathbb{R}^3$—Internal force in the backbone expressed in global frame coordinates.
m(s): $\in \mathbb{R}^3$—Internal moment in the backbone expressed in global frame coordinates.
$f_e(s)$: $\in \mathbb{R}^3$—External force per unit s on the backbone expressed in global frame coordinates.
$l_e(s)$: $\in \mathbb{R}^3$—External moment per unit s on the backbone expressed in global frame coordinates.
$f_t(s)$: $\in \mathbb{R}^3$—Sum of all forces per unit s applied to the backbone by the tendons, expressed in global frame coordinates.
$l_t(s)$: $\in \mathbb{R}^3$—Sum of all moments per unit s applied to the backbone by the tendons, expressed in global frame coordinates.

$f_i(s): \in \mathbb{R}^3$—Force per unit s applied to the $i^{th}$ tendon by its surroundings.

$n_i(s): \in \mathbb{R}^3$—Internal force in the $i^{th}$ tendon.

$\tau_i: \in \mathbb{R}$—Tension in the $i^{th}$ tendon. It is constant along s under the frictionless assumption.

B. Derivation of $f_i(s)$

Beginning with (11), $$n_i = \tau_i \frac{\dot{p}_i}{\|\dot{p}_i\|},$$

one can re-arrange and differentiate to obtain $$\dot{p}_i = \frac{1}{\tau_i} \|\dot{p}_i\| n_i,$$

$$\ddot{p}_i = \frac{1}{\tau_i}\left(\frac{d}{ds}(\|\dot{p}_i\|) n_i + \|\dot{p}_i\| \dot{n}_i\right).$$

Noting that $n_i \times n_i = 0$, one can take a cross product of the two results above to find, $$\ddot{p}_i \times \dot{p}_i = \frac{\|\dot{p}_i\|^2}{\tau_i^2}(\dot{n}_i \times n_i)$$

and so $$\dot{p}_i \times (\ddot{p}_i \times \dot{p}_i) = \frac{\|\dot{p}_i\|^3}{\tau_i^3}(n_i \times (\dot{n}_i \times n_i)).$$

Applying the vector triple product identity, $a \times (b \times c) = b(a \cdot c) - c(a \cdot b)$, one can expand the right-hand side of this equation. Since $\tau_i$ (the magnitude of $n_i$) is constant with respect to s, then $n_i \cdot \dot{n}_i = 0$ and this results in $$f_i = -\dot{n}_i = -\tau_i \frac{\dot{p}_i \times (\ddot{p}_i \times \dot{p}_i)}{\|\dot{p}_i\|^3}.$$

Using the fact that $a \times b = -b \times a$, and writing the cross products in skew-symmetric matrix notation in ($a \times b = \hat{a}b$), one arrives at (12)

$$f_i = \tau_i \frac{\dot{p}_i \times (\dot{p}_i \times \ddot{p}_i)}{\|\dot{p}_i\|^3} = \tau_i \frac{\hat{\dot{p}}_i^2}{\|\dot{p}_i\|^3} \ddot{p}_i.$$

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

For example, in some embodiments, the method described above can also be used to determine the load or external forces and moments being applied to the elastic member. In such embodiments, the 3D shape of the elastic member can be determined via some kind of sensing method (i.e., with cameras, or optical fibers, or magnetic tracking coils, or ultrasound, or fluoroscopy, etc.). Thereafter, using a known tension on the tendon and routing path for the tendon, the iterative model equations described above can be iteratively solved to determine the external forces and moments ($f_e$ and $l_e$) which result in the model-predicted shape that is close to the actual sensed shape. The resulting loads based on the model can then be used as an estimate of the loads acting on the elastic member. Accordingly, these loads can be used to provide useful information to one who is operating the continuum robot. Alternatively, a similar method can be used to compute the required tendon tension necessary to achieve forces and moments for the continuum robot to exert on its surroundings. In such embodiments, the 3D shape of the elastic member is also determined via some kind of sensing method. Thereafter, the external loads are estimated using the above-mentioned procedure. Finally, the adjustment in tension needed to achieve a desired load or shape can be determined iteratively using the system of equations.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A continuum robot, comprising:

an elastic member;

a plurality of guide portions disposed along the length of the elastic member;

at least one tendon extending through the plurality of guide portions; and a tendon actuator system including an actuator for applying a tension to the at least one tendon and a processing element for computing a resulting shape of the elastic member based at least on the applied tension, wherein said at least one tendon is arranged to extend through the plurality of guide portions to define a tendon path, wherein the at least one tendon is configured to apply a deformation force to the elastic member via the plurality of guide portions, and wherein the tendon path and a longitudinal axis of the elastic member are not parallel, and wherein the processing element is configured for computing the resulting shape by applying a coupled model that incorporates forces and torques applied by the tendons to a rod model for the elastic member.

2. The continuum robot of claim 1, wherein the tendon path is substantially helical.

3. The continuum robot of claim 1, wherein the tendon path is defined by a non-linear function.

4. The continuum robot of claim 1, wherein the processing element is configured for applying the coupled model by solving a system of equations for the coupled model defined by:

$$\dot{p} = Rv$$
$$\dot{R} = R\hat{u}$$
$$\begin{bmatrix} \dot{v} \\ \dot{u} \end{bmatrix} = \begin{bmatrix} D+A & G \\ B & C+H \end{bmatrix}^{-1} \begin{bmatrix} d \\ c \end{bmatrix}$$

where p is the centerline curvature vector for the elastic member, R is the rotation matrix for the elastic member, u is the deformed curvature vector consisting of the angular rates of change of the attached rotation matrix R with respect to arc length, v is a vector comprising linear rates of change of the attached frame with respect to arc length, C and D are stiffness matrices for the elastic member, and matrices A, B, G, H, are functions of the tension applied to the at least one tendon, the tendon path, and its derivatives, d is vector based on the external force on the elastic member, and c is vector based on an external moment on the elastic member.

5. The continuum robot of claim 4, further comprising at least one sensor for detecting an actual shape of the elastic member after the tension is applied to the at least one tendon, and wherein the processing element is further configured to determining a load on the elastic member based on the system of equations and a difference between the actual shape and the resulting shape.

6. A continuum robot, comprising:
an elastic member;
a plurality of guide portions disposed along the length of the elastic member;
at least one tendon extending through the plurality of guide portions; and
a tendon actuator system, the tendon actuator system comprising: a processing element for computing a tension to apply to the at least one tendon to achieve a target shape for the elastic member; and an actuator for applying the tension to the at least one tendon;
wherein said at least one tendon is arranged to extend through the plurality of guide portions to define a tendon path, wherein the at least one tendon is configured to apply a deformation force to the elastic member via the plurality of guide portions, and wherein the tendon path and a longitudinal axis of the elastic member are not parallel, and wherein the processing element is configured for computing the tension by applying a coupled model that incorporates forces and torques applied by the tendons to a rod model for the elastic member.

7. The continuum robot of claim 6, wherein the processing element is configured for applying the coupled model by evaluating the system of equations for the coupled model defined by:

$$\dot{p} = Rv$$
$$\dot{R} = R\hat{u}$$
$$\begin{bmatrix} \dot{v} \\ \dot{u} \end{bmatrix} = \begin{bmatrix} D+A & G \\ B & C+H \end{bmatrix}^{-1} \begin{bmatrix} d \\ c \end{bmatrix}$$

where p is the centerline curvature vector for the elastic member, R is the rotation matrix for the elastic member, u is the deformed curvature vector consisting of the angular rates of change of the attached rotation matrix R with respect to arc length, v is a vector comprising linear rates of change of the attached frame with respect to arc length, C and D are stiffness matrices for the elastic member, and matrices A, B, G, H, are functions of the tension applied to the at least one tendon, the tendon path, and its derivatives, d is vector based on the external force on the elastic member, and c is vector based on an external moment on the elastic member.

8. The continuum robot of claim 7, wherein the processing element is configured for iteratively evaluating the system of equations to compute to the tension.

9. The continuum robot of claim 7, further comprising at least one sensor for detecting an actual shape of the elastic member after the tension is applied to the at least one tendon, and wherein the processing element is further configured to determine a load on the elastic member based on the system of equations and a difference between the actual shape and the target shape.

10. A method for managing a continuum robot comprising an elastic member, a plurality of guide portions disposed along the length of the elastic member, and at least one tendon extending through the plurality of guide portions, wherein said at least one tendon is arranged to extend through the plurality of guide portions to define a tendon path, and wherein the at least one tendon is configured to apply a deformation force to the elastic member via the plurality of guide portions, the method comprising:
applying a tension to the at least one tendon; and
controlling at least one of a shape of the elastic member or a tension of the at least one tendon by applying a coupled model that incorporates forces and torques applied by the tendons to a rod model for the elastic member.

11. The method of claim 10, further comprising detecting an actual shape of the elastic member after the tension is applied to the at least one tendon, and wherein the processing element is further configured for determining a load on the elastic member based on the system of equations and a difference between the actual shape and the resulting shape.

12. The method of claim 10, further comprising selecting the tendon path and a longitudinal axis of the elastic member to be non-parallel.

13. The method of claim 11, further comprising selecting the tendon path to be helical with respect to the longitudinal axis of the elastic member.

14. The method of claim 11, further comprising selecting the tendon path based on non-linear function.

15. A non-transitory computer-readable medium having computer-readable code stored thereon for causing a computer to perform the method recited in any one of claims 10-14.

16. A continuum robot, comprising:
an elastic member;
a plurality of guide portions disposed along the length of the elastic member; and at least one tendon extending through the plurality of guide portions and arranged to extend through the plurality of guide portions to define a tendon path, wherein the at least one tendon is configured to apply a deformation force to the elastic member via the plurality of guide portions;

an actuator for applying a tension to the at least one tendon; and a processing element for controlling at least one of a shape of the elastic member or the tension by applying a coupled model defined that incorporates forces and torques applied by the tendons to a rod model for the elastic member.

17. The continuum robot of claim 4, further comprising at least one sensor for detecting an actual shape of the elastic member, and wherein the processing element is further configured to determining a load on the elastic member based on the system of equations, the actual shape, and the applied tension.

18. The continuum robot of claim 16, wherein the tendon path and a longitudinal axis of the elastic member are not parallel.

19. The method of claim 10, wherein the applying of the coupled model defined comprises computing the shape and the tension by solving the system of equations given by:

$$\dot{p} = Rv$$
$$\dot{R} = R\hat{u}$$
$$\begin{bmatrix} \dot{v} \\ \dot{u} \end{bmatrix} = \begin{bmatrix} D+A & G \\ B & C+H \end{bmatrix}^{-1} \begin{bmatrix} d \\ c \end{bmatrix}$$

where p is the centerline curvature vector for the elastic member, R is the rotation matrix for the elastic member, u is the deformed curvature vector consisting of the angular rates of change of the attached rotation matrix R with respect to arc length, v is a vector comprising linear rates of change of the attached frame with respect to arc length, C and D are stiffness matrices for the elastic member, and matrices A, B, G, H, are functions of the tension applied to the at least one tendon, the tendon path, and its derivatives, d is vector based on the external force on the elastic member, and c is vector based on an external moment on the elastic member.

20. The continuum robot of claim 16, wherein the applying of the combined model comprises computing the shape and the tension by solving the system of equations given by:

$$\dot{p} = Rv$$
$$\dot{R} = R\hat{u}$$
$$\begin{bmatrix} \dot{v} \\ \dot{u} \end{bmatrix} = \begin{bmatrix} D+A & G \\ B & C+H \end{bmatrix}^{-1} \begin{bmatrix} d \\ c \end{bmatrix}$$

where p is the centerline curvature vector for the elastic member, R is the rotation matrix for the elastic member, u is the deformed curvature vector consisting of the angular rates of change of the attached rotation matrix R with respect to arc length, v is a vector comprising linear rates of change of the attached frame with respect to arc length, C and D are stiffness matrices for the elastic member, and matrices A, B, G, H, are functions of the tension applied to the at least one tendon, the tendon path, and its derivatives, d is vector based on the external force on the elastic member, and c is vector based on an external moment on the elastic member.

* * * * *